(12) United States Patent
Mizuno et al.

(10) Patent No.: US 12,456,753 B2
(45) Date of Patent: Oct. 28, 2025

(54) ELECTROLYTE COMPOSITION, SOLVENT COMPOSITION, NON-AQUEOUS ELECTROLYTE, AND USE THEREOF

(71) Applicant: NIPPON SHOKUBAI CO., LTD., Osaka (JP)

(72) Inventors: Hiroyuki Mizuno, Suita (JP); Yukihiro Fukata, Suita (JP); Ryo Watabe, Suita (JP); Motohiro Arakawa, Suita (JP); Takayuki Kobatake, Suita (JP); Yusuke Oyama, Suita (JP); Chie Onoda, Suita (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 690 days.

(21) Appl. No.: 17/615,477

(22) PCT Filed: Apr. 28, 2020

(86) PCT No.: PCT/JP2020/018124
§ 371 (c)(1),
(2) Date: Nov. 30, 2021

(87) PCT Pub. No.: WO2020/241161
PCT Pub. Date: Dec. 3, 2020

(65) Prior Publication Data
US 2022/0238920 A1 Jul. 28, 2022

(30) Foreign Application Priority Data

May 31, 2019 (JP) .................................. 2019-103361
May 31, 2019 (JP) .................................. 2019-103362

(51) Int. Cl.
| | | |
|---|---|---|
| *H01M 10/0568* | (2010.01) | |
| *H01M 10/052* | (2010.01) | |
| *H01M 10/0567* | (2010.01) | |
| *H01M 10/0569* | (2010.01) | |

(52) U.S. Cl.
CPC ..... *H01M 10/0568* (2013.01); *H01M 10/052* (2013.01); *H01M 10/0567* (2013.01); *H01M 10/0569* (2013.01)

(58) Field of Classification Search
CPC ........... H01M 10/056; H01M 10/0567; H01M 10/0569; H01M 10/052
See application file for complete search history.

(56) References Cited

U.S. PATENT DOCUMENTS

| | | | | |
|---|---|---|---|---|
| 4,786,499 A | * | 11/1988 | Slane | H01M 4/485 |
| | | | | 429/326 |
| 2014/0075746 A1 | | 3/2014 | Schmidt | |
| 2014/0369919 A1 | | 12/2014 | Schmidt | |
| 2016/0141727 A1 | * | 5/2016 | Young | H01M 10/345 |
| | | | | 429/163 |
| 2016/0218394 A1 | | 7/2016 | Yamada et al. | |
| 2016/0301106 A1 | | 10/2016 | Schmidt | |
| 2019/0152792 A1 | | 5/2019 | Yamada et al. | |
| 2019/0379088 A1 | | 12/2019 | Schmidt et al. | |
| 2020/0181071 A1 | * | 6/2020 | Kozelj | H01M 10/0568 |

FOREIGN PATENT DOCUMENTS

| | | | |
|---|---|---|---|
| CA | 3037434 A1 | * | 4/2018 |
| EP | 3 339 461 A1 | | 6/2018 |
| EP | 3 466 871 A1 | | 4/2019 |
| JP | 2013-84562 A | | 5/2013 |
| JP | 2015-74798 A | | 4/2015 |
| JP | 2015-205815 A | | 11/2015 |
| JP | 5816998 B | | 11/2015 |
| JP | 2018-35054 A | | 3/2018 |
| WO | WO-2017-204225 A1 | * | 11/2017 |
| WO | 2018/104674 A1 | | 6/2018 |

OTHER PUBLICATIONS

"A highly efficient and stable organic additive for the positive electrolyte in vanadium redox flow batteries: taurine biomolecules containing -NH2 and -SO3H functional groups", Hwang et al., Journal of Materials Chemistry A, 6, 4695, Jan. 29, 2018.*
Krumdick, G et al., "Process R&D and Scale up of Critical Battery Materials," Argonne National Laboratory, (Jun. 10, 2015).
KR Office Action dated May 14, 2025 as received in Application No. 10-2021-7042177.

* cited by examiner

*Primary Examiner* — Kenneth J Douyette
(74) *Attorney, Agent, or Firm* — Maschoff Brennan

(57) ABSTRACT

An electrolyte composition includes: a sulfonylimide compound represented by the following general formula (1) as an electrolyte salt; and an amidosulfuric acid component.

$$\text{LiN}(X^1SO_2)(X^2SO_2) \qquad (1)$$

(where $X^1$ and $X^2$ are identical to or different from each other, and each represent a fluorine atom, an alkyl group with a carbon number of 1 to 6, or a fluoroalkyl group with a carbon number of 1 to 6).

22 Claims, No Drawings

ELECTROLYTE COMPOSITION, SOLVENT COMPOSITION, NON-AQUEOUS ELECTROLYTE, AND USE THEREOF

TECHNICAL FIELD

The present invention relates to a novel electrolyte composition, solvent composition, non-aqueous electrolyte solution, use thereof, and the like.

BACKGROUND ART

As an electrolyte constituting an electrolyte solution, various components prepared according to the kinds or the like of batteries applied are known. For example, as an electrolyte used in a lithium ion battery and the like, various lithium salts are known (Patent Document 1).

CITATION LIST

Patent Document

PATENT DOCUMENT 1: Japanese Patent No. 5816998

SUMMARY OF THE INVENTION

Technical Problem

It is an object of the present invention to provide a novel electrolyte composition, solvent composition (composition and the like for an electrolyte solution), non-aqueous electrolyte solution, and use thereof such as a battery, a storage container for the composition and the like, and a method of storing or transporting the composition and the like.

Solution to the Problem

The present inventors have found that combining an amidosulfuric acid component as a specific component with a specific fluorine-containing sulfonylimide lithium salt as an electrolyte salt can unexpectedly, for example, reduce the resistance (e.g., resistance derived from a positive electrode) in a battery (e.g., a lithium secondary battery) and the like, and the present inventors have further conducted studies and thus completed the present invention.

That is, the present invention relates to the following aspects of the present invention:
  an electrolyte composition including: a sulfonylimide compound represented by the general formula (1) LiN($X^1SO_2$)($X^2SO_2$) (where $X^1$ and $X^2$ are identical to or different from each other and each represent a fluorine atom, an alkyl group with a carbon number of 1 to 6, or a fluoroalkyl group with a carbon number of 1 to 6) as an electrolyte salt; and an amidosulfuric acid component;
  a solvent composition and a non-aqueous electrolyte solution each including: a sulfonylimide compound represented by the general formula (1) LiN($X^1SO_2$)($X^2SO_2$) (where $X^1$ and $X^2$ are identical to or different from each other and each represent a fluorine atom, an alkyl group with a carbon number of 1 to 6, or a fluoroalkyl group with a carbon number of 1 to 6) as an electrolyte salt; an amidosulfuric acid component; and a solvent;
  an electrolyte solution including the electrolyte composition or the solvent composition, or a battery including the non-aqueous electrolyte solution;
  a container containing the solvent composition; and
  a method of storing or transporting the solvent composition or the container.

Advantages of the Invention

The present invention can provide a novel electrolyte composition, solvent composition (non-aqueous electrolyte solution), and the like each including: a specific fluorine-containing sulfonylimide lithium salt (i.e., a sulfonylimide compound represented by the general formula (1)) as an electrolyte salt; and a specific component (i.e., an amidosulfuric acid component).

This composition and the like can increase the performance of an electrolyte solution and further a battery and the like including the electrolyte solution. For example, combining the specific component as a constituent component of an electrolyte solution can reduce the resistance (e.g., resistance derived from a positive electrode) in a battery (e.g., a lithium secondary battery) compared with the use of an electrolyte solution without the combination of the specific component.

Particularly, this effect of reducing the resistance can be efficiently exhibited not only at an ordinary temperature and the like but also at a low temperature. As a function of the amidosulfuric acid component, this function has not been known at all and can be said to be quite unexpected.

In addition, due to such a reduction in resistance, the present invention can improve or increase the performance (e.g., a charge and discharge characteristic, a high-temperature storage characteristic, and a cycle characteristic) of a battery and the like compared with, for example, a case without the combination of the specific component.

Further, another aspect of the present invention can provide a stable composition and the like. For example, the present invention can provide a composition and the like that improve or reduce problems specific to the use of the specific fluorine-containing sulfonylimide lithium salt, such as a decrease in the pH over time and decomposition of the solvent, and that have excellent stability (storage stability and the like). Further, such a stable composition and the like can improve or reduce, for example, corrosion of a container.

Particularly, these problems, which are presumed to occur due to water in a system, have occurred also when the system includes the amidosulfuric acid component. The composition and the like of the other aspect of the present invention involving combining a specific solvent (i.e., a solvent having a relative permittivity of 10 or less) can, however, improve or reduce these problems even when the system includes the amidosulfuric acid component or some water (further, even without removing water from the system at a high level). This result is quite unexpected.

DESCRIPTION OF EMBODIMENTS

\<Electrolyte Composition\>

An electrolyte composition includes an electrolyte salt and an amidosulfuric acid component. Therefore, the electrolyte composition can also be referred to as an electrolyte salt including an amidosulfuric acid component.

[Electrolyte Salt]

The electrolyte salt includes at least a sulfonylimide compound (hereinafter referred to as a "sulfonylimide compound (1)", a fluorine-containing sulfonylimide salt) represented by the following general formula (1).

[Chemical 1]

$$\text{LiN}(X^1SO_2)(X^2SO_2) \quad (1)$$

(where $X^1$ and $X^2$ are identical to or different from each other and each (independently) represent a fluorine atom, an alkyl group with a carbon number of 1 to 6, or a fluoroalkyl group with a carbon number of 1 to 6.)

Examples of the alkyl group with a carbon number of 1 to 6 include a methyl group, an ethyl group, a propyl group, an isopropyl group, a butyl group, a pentyl group, and a hexyl group. Among alkyl groups with a carbon number of 1 to 6, the alkyl group with a carbon number of 1 to 6 is preferably a linear or branched alkyl group with a carbon number of 1 to 6, more preferably a linear alkyl group with a carbon number of 1 to 6.

Examples of the fluoroalkyl group with a carbon number of 1 to 6 include one obtained by substituting some or all of the hydrogen atoms contained in an alkyl group with a carbon number of 1 to 6 by a fluorine atom. Examples of the fluoroalkyl group with a carbon number of 1 to 6 include a fluoromethyl group, a difluoromethyl group, a trifluoromethyl group, a fluoroethyl group, a difluoroethyl group, a trifluoroethyl group, and a pentafluoroethyl group. The fluoroalkyl group may particularly be a perfluoroalkyl group.

The substituents $X^1$ and $X^2$ are each preferably a fluorine atom and a perfluoroalkyl group (e.g., a perfluoroalkyl group with a carbon number of 1 to 6, such as a trifluoromethyl group, a pentafluoroethyl group, or a heptafluoropropyl group), more preferably a fluorine atom, a trifluoromethyl group, and a pentafluoroethyl group, further more preferably a fluorine atom and a trifluoromethyl group, and yet further more preferably a fluorine atom. The substituents $X^1$ and $X^2$ may be identical to or different from each other.

The sulfonylimide compound (1) is a salt of a fluorine-containing sulfonylimide ion and a lithium cation.

Examples of the fluorine-containing sulfonylimide ion include an ion (anion) represented by the following formula (1-1).

[Chemical 2]

(1-1)

(where $X^1$ and $X^2$ are the same as described above.)

Examples of the fluorine-containing sulfonylimide ion represented by the formula (1-1) include an ion [or a (fluorosulfonyl) ion] having, in the formula (1-1), a fluorine atom (F) as one of $X^1$ or $X^2$ bonded to the sulfonyl group ($-SO_2-$) and an alkyl group as the other of $X^1$ or $X^2$, an ion [or a bis(fluorosulfonyl) ion] having fluorine atoms as $X^1$ and $X^2$ bonded to the respective sulfonyl groups, an ion [or a (fluoroalkylsulfonyl) ion] having a fluoroalkyl group as one of $X^1$ or $X^2$ bonded to the sulfonyl group and a fluorine atom or an alkyl group as the other of $X^1$ or $X^2$, and an ion [or a bis(fluoroalkylsulfonyl) ion] having fluoroalkyl groups as $X^1$ and $X^2$ bonded to the respective sulfonyl groups. The two fluoroalkyl groups may be identical to or different from each other.

Specific examples of the sulfonylimide compound (1) include lithium bis(fluorosulfonyl)imide (LiN(FSO$_2$)$_2$, hereinafter also referred to as "LiFSI"), lithium bis(trifluoromethylsulfonyl)imide (LiN(CF$_3$SO$_2$)$_2$, hereinafter also referred to as "LiTFSI"), lithium (fluorosulfonyl)(methylsulfonyl)imide, lithium (fluorosulfonyl)(ethylsulfonyl)imide, lithium (fluorosulfonyl)(trifluoromethylsulfonyl)imide, lithium(fluorosulfonyl)(pentafluoroethylsulfonyl)imide, lithium (fluorosulfonyl)(pentafluoropropylsulfonyl)imide, lithium bis(pentafluoroethylsulfonyl)imide, and lithium bis(heptafluoropropylsulfonyl)imide. As the sulfonylimide compound (1), these compounds may be used alone or in combination of two or more thereof. Alternatively, as the sulfonylimide compound (1), a commercially available product may be used, or one obtained by synthesis using any known method may also be used.

Among these examples, the sulfonylimide compound (1) is preferably lithium bis(fluorosulfonyl)imide and lithium bis(trifluoromethylsulfonyl)imide, more preferably lithium bis(fluorosulfonyl)imide, to obtain battery characteristics (such as a cycle characteristic, a rate characteristic, and a low-temperature characteristic) and the like.

The specific fluorine-containing sulfonylimide lithium salt such as the sulfonylimide compound (1) is preferable also because it can prominently exhibit the effect of reducing the resistance and the effect of improving the battery characteristics when combined with the amidosulfuric acid component. Meanwhile, the reasons for these effects are not clear, but the fluorine-containing sulfonylimide salt is, along with its excellent actions of reducing ion conduction and reducing interface resistance, considered to easily and efficiently exert the effects brought about by being combined with the amidosulfuric acid component.

The electrolyte salt only has to include the sulfonylimide compound (1), but may also include another electrolyte (an electrolyte other than the sulfonylimide compound (1)). Examples of the other electrolyte include an imide salt and a non-imide salt.

Examples of the imide salt include a fluorine-containing sulfonylimide salt (hereinafter referred to as "another sulfonylimide compound") that is not the sulfonylimide compound (1). Examples of the other sulfonylimide compound include a salt of the fluorine-containing sulfonylimide ion represented by the formula (1-1) and a cation other than a lithium ion [a non-lithium salt (e.g., a salt obtained by substituting, in the sulfonylimide compound (1), lithium (ion) by another metal (ion))]. The two fluoroalkyl groups may be identical to or different from each other.

Examples of the cation other than the lithium ion include a metal ion other than the lithium ion [or metal cations such as an alkali metal ion other than the lithium ion (e.g., a sodium ion, a potassium ion, a rubidium ion, and a cesium ion), an alkali earth metal ion (e.g., a beryllium ion, a magnesium ion, a calcium ion, a strontium ion, and a barium ion), and an aluminum ion], an ammonium ion (e.g., quaternary ammonium ions such as a tetraethylammonium ion and a triethylmethylammonium ion), and a phosphonium ion (e.g., quaternary phosphonium ions such as a tetramethylphosphonium ion).

The other sulfonylimide compound is not particularly limited in terms of the combination of an anion and a cation, and may have any combination of the anions and cations described above (a salt may be formed by any combination).

Specific examples of the other sulfonylimide compound include:

non-lithium salts of fluorosulfonylimides (e.g., a sodium salt, i.e., sodium fluorosulfonylimide and the like) such as a non-lithium salt of a fluorosulfonylimide and a non-lithium salt of a (fluorosulfonyl)(fluoroalkylsulfonyl)imide;

and a non-lithium salt of fluoroalkylsulfonyl imide (e.g., a sodium salt, i.e., a sodium fluoroalkylsulfonyl imide and the like) such as a non-lithium salt of a bis(fluoroalkylsulfonyl) imide.

Examples of the non-lithium salt of a fluorosulfonylimide include: sodium bis(fluorosulfonyl)imide, and potassium bis(fluorosulfonyl)imide.

Examples of the non-lithium salt of a (fluorosulfonyl) (fluoroalkylsulfonyl)imide include: non-lithium salts of (fluorosulfonyl)(fluoro $C_{1-6}$alkylsulfonyl)imides [preferably non-lithium salts of (fluorosulfonyl)(perfluoro $C_{1-6}$alkylsulfonyl)imides] such as a non-lithium salt of a (fluorosulfonyl)(trifluoromethylsulfonyl)imide [e.g., sodium (fluorosulfonyl)(trifluoromethylsulfonyl)imide, potassium (fluorosulfonyl)(trifluoromethylsulfonyl)imide], a non-lithium salt of a (fluorosulfonyl)(pentafluoroethylsulfonyl) imide [e.g., sodium (fluorosulfonyl)(pentafluoroethylsulfonyl)imide], and a non-lithium salt of a (fluorosulfonyl)(heptafluoropropylsulfonyl)imide [e.g., sodium (fluorosulfonyl)(heptafluoropropylsulfonyl)imide].

Examples of the non-lithium salt of a bis(fluoroalkylsulfonyl)imide include: non-lithium salts of bis(fluoro $C_{1-6}$alkylsulfonyl)imides [preferably non-lithium salts of bis(perfluoro $C_{1-6}$alkylsulfonyl)imides, or a salt of $(C_nF_{2n+1}SO_2)_2N$— (where n is an integer of 1 to 6) and a cation] such as a non-lithium salt of a bis(trifluoromethylsulfonyl)imide salt [e.g., sodium bis(trifluoromethylsulfonyl)imide, potassium bis(trifluoromethylsulfonyl)imide], a non-lithium salt of a bis(pentafluoroethylsulfonyl)imide [e.g., sodium bis(pentafluoroethylsulfonyl)imide], and a non-lithium salt of a bis(heptafluoropropylsulfonyl)imide [e.g., sodium bis(heptafluoropropylsulfonyl)imide]. These other sulfonylimide compounds may be used alone or in combination of two or more thereof. Alternatively, as the other sulfonylimide compound, a commercially available product may be used, or one obtained by synthesis using a known method may also be used.

When a plurality of fluorine-containing sulfonylimide salts such as the sulfonylimide compound (1) and the other sulfonylimide compound are used in combination as the electrolyte salt, the combination form is not particularly limited as long as the electrolyte salt includes at least the sulfonylimide compound (1). Examples of the combination form include (i) a combination of a bis(fluorosulfonyl)imide salt [e.g., lithium bis(fluorosulfonyl)imide (sulfonylimide compound (1))] with a bis(fluoroalkylsulfonyl)imide salt [e.g., lithium bis(trifluoromethylsulfonyl)imide (sulfonylimide compound (1)), sodium bis(trifluoromethylsulfonyl)imide (other sulfonylimide compound)], and (ii) a combination of two or more different bis(fluoroalkylsulfonyl)imide salts {e.g., a combination of a bis(trifluoromethylsulfonyl)imide salt [e.g., lithium bis(trifluoromethylsulfonyl)imide, sodium bis(trifluoromethylsulfonyl)imide] with a bis(fluoro $C_{2-6}$alkylsulfonyl)imide salt [e.g., lithium bis(pentafluoroethylsulfonyl)imide (sulfonylimide compound (1)), sodium bis(pentafluoroethylsulfonyl)imide (other sulfonylimide compound)]}. In this case, the electrolyte salt includes at least one of lithium bis(trifluoromethylsulfonyl)imide and lithium bis(pentafluoroethylsulfonyl)imide.

Examples of the non-imide salt include a salt of a non-imide-based anion and a cation (lithium ions and the cations shown above as examples).

Examples of the non-imide-based anion include a boron-based ion [e.g., $BF_4^-$, $BF(CF_3)_3^-$, $B(CN)_4^-$, and $B_{12}F_{12-x}H_x$ (where X is a number of less than 12)], a phosphorus-based ion {e.g., $PF_6^-$, an ion represented by $PF_m(C_nF_{2n+1})_{6-m}^-$ (where m represents 1 to 5 and n represents 1 or more) [e.g., $PF_3(CF_3)_3^-$, $PF_3(C_2F_5)_3^-$, $PF_3(C_3F_7)_3^-$, and $PF_3(C_4F_9)_3^-$], and $PF_2O_2^-$}, an antimony-based ion (e.g., $SbF_6^-$), an arsenic-based ion (e.g., $AsF_6^-$), a perchlorate ion ($ClO_4^-$), a thiocyanate ion ($NCS^-$), an aluminum-based ion (e.g., $AlCl_4^-$ and $AlF_4^-$), a sulfonic acid-based ion (e.g., $CF_3SO_3^-$ and $FSO_3^-$), a methide-based ion (e.g. $C[(CF_3SO_2)_3]^-$), a dinitroamine anion $((O_2N)_2N)$, a cyanamide ion (e.g., $N[(CN)_2]^-$), a triazolate ion (e.g., a dicyanotriazolate ion), and an imide ion (an imide-based ion and an imide anion).

Specific examples of the non-imide salt include salts of the non-imide anions shown above as examples {e.g., a lithium salt [e.g., $LiBF_4$, $LiBF(CF_3)_3$, $LiBi_2F_{12-x}H_x$, $LiPF_6$, $LiPF_3(CF_3)_3$, $LiPF_3(C_2F_5)_3$, $LiPF_3(C_3F_7)_3$, $LiPF_3(C_4F_9)_3$, $LiSbF_6$, $LiAsF_6$, $LiClO_4$, $LiSCN$, $LiAlF_4$, $CF_3SO_3Li$, $LiC[(CF_3SO_2)_3]$, $LiN(NO_2)$, and $LiN[(CN)_2]$], and a non-lithium salt [e.g., salts obtained by substituting, in these lithium salts, lithium (ion) with another metal (ion) (e.g., $NaBF_4$, $NaPF_6$, and $NaPF_3(CF_3)_3$)]}. These non-imide salts may be used alone or in combination of two or more thereof. Alternatively, as the non-imide salt, a commercially available product may be used, or one obtained by synthesis using a known method may also be used.

Among these examples, the other electrolyte is preferably a non-imide salt, more preferably a compound represented by the following general formula (2) (hereinafter referred to as a "fluorophosphoric acid compound (2)"), a compound represented by the general formula (3) (hereinafter referred to as a "fluoroboric acid compound (3)"), and lithium hexafluoroarsenate ($LiAsF_6$), in light of ion conductivity and costs.

[Chemical 3]

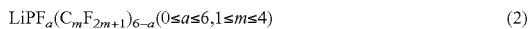

$$LiPF_a(C_mF_{2m+1})_{6-a} (0 \leq a \leq 6, 1 \leq m \leq 4) \quad (2)$$

[Chemical 4]

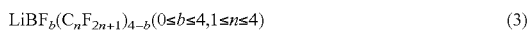

$$LiBF_b(C_nF_{2n+1})_{4-b} (0 \leq b \leq 4, 1 \leq n \leq 4) \quad (3)$$

Examples of the fluorophosphoric acid compound (2) include $LiPF_6$, $LiPF_3(CF_3)_3$, $LiPF_3(C_2F_5)_3$, $LiPF_3(C_3F_7)_3$, and $LiPF_3(C_4F_9)_3$. Among the examples, the fluorophosphoric acid compound (2) is preferably $LiPF_6$ and $LiPF_3(C_2F_5)_3$, more preferably $LiPF_6$.

Examples of the fluoroboric acid compound (3) include $LiBF_4$, $LiBF(CF_3)_3$, $LiBF(C_2F_5)_3$, and $LiBF(C_3F_7)_3$. Among the examples, the fluoroboric acid compound (3) is preferably $LiBF_4$ and $LiBF(CF_3)_3$, and more preferably $LiBF_4$.

These electrolyte salts may be present (included) in an ion form in a composition.

The proportion of the sulfonylimide compound (1) relative to the whole electrolyte salt is, for example, 1 mol % or more, 5 mol % or more, 10 mol % or more, 20 mol % or more, 30 mol % or more, 40 mol % or more, 50 mol % or more, 60 mol % or more, 70 mol % or more, 80 mol % or more, 90 mol % or more, 95 mol % or more, 99 mol % or more, or 100 mol % (including substantially only the sulfonylimide compound (1)).

When the other electrolyte includes at least one compound selected from the group consisting of the fluorophosphoric acid compound (2), the fluoroboric acid compound (3), and lithium hexafluoroarsenate ($LiAsF_6$), the proportion of this compound relative to the whole other electrolyte may be, for example, 1 mol % or more, 5 mol % or more, 10 mol % or more, 20 mol % or more, 30 mol % or more, 40 mol % or more, 50 mol % or more, 60 mol % or more, 70 mol % or more, 80 mol % or more, 90 mol % or more, 95 mol % or more, 99 mol % or more, or 100 mol % (substantially including only at least one compound selected from the group consisting of the fluorophosphoric acid compound (2), the fluoroboric acid compound (3), and lithium hexafluoroarsenate ($LiAsF_6$)).

When the sulfonylimide compound (1) [e.g., the fluorosulfonylimide salt including at least one selected from lithium bis(fluorosulfonyl)imide and lithium bis(trifluoromethylsulfonyl)imide] is combined with the other electrolyte [e.g., the other electrolyte including at least one compound selected from the group consisting of $LiPF_6$, $LiBF_4$, and $LiAsF_6$], the ratio therebetween can be selected, as appropriate, according to the desired characteristics or the like. The ratio of sulfonylimide compound (1)/other electrolyte by mole may be, for example, 99/1 to 1/99 (e.g., 97/3 to 3/97), preferably 95/5 to 5/95 (e.g., 93/7 to 7/93), more preferably 90/10 to 10/90 (e.g., 83/17 to 17/83), or may be 80/20 to 20/80 (e.g., 77/23 to 23/77), 75/25 to 25/75 (e.g., 73/27 to 27/73), 70/30 to 30/70 (e.g., 67/33 to 33/67), or 65/35 to 35/65 (e.g., 63/37 to 37/63). Alternatively, the ratio by mole may be 80/20 to 1/99 (e.g., 70/30 to 10/90, 65/35 to 20/80, 60/40 to 30/70, or 55/45 to 40/60), to allow the sulfonylimide compound (1) to efficiently exhibit the effects thereof while enabling a combination of the sulfonylimide compound (1) with the other electrolyte.

[Amidosulfuric Acid Component]

Examples of the amidosulfuric acid component (an amidosulfuric acid compound, an amidosulfuric acid-based compound, and amidosulfuric acids) include an amidosulfuric acid (sulfamic acid), an amidosulfuric acid derivative, and salts thereof. As the amidosulfuric acid component, these compounds may be used alone or in combination of two or more thereof.

The structure of the amidosulfuric acid component is not particularly limited, and may be, for example, a neutral type (e.g., $H_2NSO_2(OH)$, $HN=SO(OH)_2$) or a zwitterion type (e.g., $H_3N^+SO_3^-$, $H_2N^+=SO(OH)O^-$), or may be a structure including both these types.

Examples of the amidosulfuric acid derivative include a N-substituted amidosulfuric acid (e.g., N-substituted sulfamic acid).

This amidosulfuric acid derivative (and a salt thereof) may be a compound (N-substituted amidosulfuric acid and a salt thereof) represented by the following formula (4). The following formula (4) is represented as a neutral-type compound ($R^1R^2NSO_2(OM)$), but may be represented as a zwitterion type compound or may include both the compounds.

[Chemical 5]

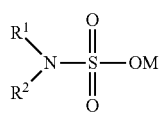

(4)

(In the formula (4), $R^1$ and $R^2$ each represent H (hydrogen atom), or an alkyl group with a carbon number of 1 to 10, a cycloalkyl group with a carbon number of 3 to 10, an aryl group with a carbon number of 6 to 16, an aralkyl group with a carbon number of 7 to 16, or an alkanoyl group with a carbon number of 2 to 16, each of which may have a hydroxyl group or a substituent, and $R^1$ and $R^2$ may each contain a hetero atom and form a ring structure. $R^1$ and $R^2$ may be identical to or different from each other when being groups described above other than H (when either one of $R^1$ or $R^2$ is H, $R^1$ and $R^2$ are not identical to each other (there is no case where $R^1$ and $R^2$ are both H)). M represents H (hydrogen atom) or a metal atom.

In the formula (4), examples of the alkyl group with a carbon number of 1 to 10 include a methyl group, examples of the cycloalkyl group with a carbon number of 3 to 10 include a cyclopropyl group, examples of the aryl group with a carbon number of 6 to 16 include a phenyl group and a naphthyl group, examples of the aralkyl group with a carbon number of 7 to 16 include a benzyl group and a phenethyl group, and examples of the alkanoyl group with a carbon number of 2 to 16 include a benzoyl group.

These groups may each contain a hetero atom (e.g., a nitrogen atom, an oxygen atom, a sulfur atom, and a phosphorus atom). Examples of these hetero atom-containing groups include a group in which some of the carbon atoms are substituted with hetero atoms, for example, a thiocycloalkyl group (e.g., a group corresponding to a thiocycloalkane such as thiepane, thiocane, thietane, thiane, or dithiane).

Examples of the substituent in these groups include, although not limited thereto, a hydroxyl group, a halogen atom, an amino group, a carboxyl group, an alkoxy group, and an acyl group. These substituents may be used alone or in combination of two or more thereof.

Examples of the metal atom include alkali metal atoms such as lithium, sodium, and potassium; alkali earth metal atoms such as magnesium, calcium, and barium; and aluminum.

Specific examples of the amidosulfuric acid derivative and the salt thereof [the N-substituted amidosulfuric acid and the salt thereof (or the compound represented by the formula (4))] include N-hydroxyamidosulfuric acid, N-mono- or di-alkyl amidosulfuric acid [e.g., N-methylamidosulfuric acid, N-ethylamidosulfuric acid, N-(1-methylpropyl)amidosulfuric acid, N-(2-methylbutyl)amidosulfuric acid, N-(2,2-dimethylpropyl)amidosulfuric acid, N,N-diethylamidosulfuric acid, N-(3-hydroxypropyl)amidosulfuric acid, N-methyl-N-(2,3-dihydroxylpropyl)amidosulfuric acid, N,N-bis(2-hydroxyethyl)amidosulfuric acid, N-(2,3-dihydroxypropyl)amidosulfuric acid, N-(3-methoxy-4-methylphenyl)amidosulfuric acid, N-methyl-N-(2-hydroxy-3-chloropropyl)amidosulfuric acid, N-(2-hydroxy-3-chloropropyl)amidosulfuric acid, N-ethyl-N-(2-hydroxy-3-chloropropyl)amidosulfuric acid], N-mono- or di-cycloalkyl amidosulfuric acid (e.g., N-cyclohexylamidosulfuric acid, N,N-dicyclohexylamidosulfuric acid), N-mono- or di-aryl amidosulfuric acid [e.g., N-phenylamidosulfuric acid, N-naphthylamidosulfuric acid, N-hydroxy-N-(2-hydroxy-1-naphthyl)amidosulfuric acid, N-(4-bromophenyl)amidosulfuric acid], N-mono- or di-aralkyl amidosulfuric acid [e.g., N-benzylamidosulfuric acid, N-(D-methylphenethyl)amidosulfuric acid], N-alkyl-N-arylamidosulfuric acid (e.g., N-ethyl-N-phenylamidosulfuric acid), N-mono- or di-acyl amidosulfuric acid [e.g., N-benzoylamidosulfuric acid, N-(3-chloroalanyl)amidosulfuric acid, N-(3-chloro-3-methylalanyl)amidosulfuric acid], and N-thiocycloalkylamidosulfuric acid [e.g., N-(thiepane-4-yl)amidosulfuric acid, N-thiocane-4-ylamidosulfuric acid, thiocane-5-ylamidosulfuric acid, N-thietane-3-ylamidosulfuric acid, N-1,3-dithiane-5-ylamidosulfuric acid, N-(thiane-3-yl)amidosulfuric acid, and N-(thiolane-3-yl)amidosulfuric acid], and salts thereof. These amidosulfuric acid derivatives and salts thereof may be used alone or in combination of two or more thereof.

Alternatively, the amidosulfuric acid derivative (and the salt thereof) may also be taurine (2-aminoethanesulfonic acid (aminoethylsulfonic acid), $H_2N—CH_2—CH_2—SO_3H$) or the like.

The amidosulfuric acid component is not particularly limited in terms of the salt, and may be, for example, a salt including amidosulfuric acid or an amidosulfuric acid derivative as either a base or an acid, and may be typically a salt including amidosulfuric acid or an amidosulfuric acid derivative as an acid (a salt of amidosulfuric acid or an amidosulfuric acid derivative with a base).

Specific examples of the salt include a metal salt [e.g., an alkali metal salt (e.g., a lithium salt, a sodium salt, and a potassium salt), an alkali earth metal salt (e.g., a magnesium salt, a calcium salt, and a barium salt), and an aluminum salt]. A preferred salt includes an alkali metal salt (e.g., a lithium salt). The salt may also be a salt corresponding to a cation of the electrolyte salt to be combined. For example, when a lithium salt is used as the electrolyte salt, the amidosulfuric acid component may include a lithium salt (lithium amidosulfate or the like).

The amidosulfuric acid component may representatively include at least one selected from amidosulfuric acid, an amidosulfuric acid derivative, and an alkali metal salt thereof, and may particularly include at least one selected from amidosulfuric acid and an alkali metal salt of amidosulfuric acid (e.g., lithium amidosulfate).

The electrolyte composition includes the electrolyte salt and the amidosulfuric acid component. Therefore, one aspect of the present invention can also be directed to the electrolyte salt including the amidosulfuric acid component.

The proportion of the amidosulfuric acid component relative to the electrolyte composition (the total amount of the electrolyte salt and the amidosulfuric acid component) is selected from a range of, for example, around 0.001 ppm by mass or more (e.g., 0.003 ppm by mass to 50000 ppm by mass), may also be 0.005 ppm by mass or more (e.g., 0.007 ppm by mass to 10000 ppm by mass), preferably 0.01 ppm by mass or more (e.g., 0.012 ppm by mass to 8000 ppm by mass), more preferably around 0.05 ppm by mass or more (e.g., 0.07 ppm by mass to 5000 ppm by mass), and may also be 0.1 ppm by mass or more (e.g., 0.15 ppm by mass to 10000 ppm by mass), 0.2 ppm by mass or more (e.g., 0.25 ppm by mass to 8000 ppm by mass), 0.3 ppm by mass or more (e.g., 0.5 ppm by mass to 7000 ppm by mass), 1 ppm by mass or more (e.g., 1 ppm by mass to 6000 ppm by mass), 5 ppm by mass or more (e.g., 5 ppm by mass to 6000 ppm by mass), 10 ppm by mass or more (e.g., 10 ppm by mass to 5000 ppm by mass), 50 ppm by mass or more (e.g., 65 ppm by mass to 4000 ppm by mass), 100 ppm by mass or more (e.g., 100 ppm by mass to 3000 ppm by mass), or 200 ppm by mass or more (e.g., 200 ppm by mass to 2500 ppm by mass).

Meanwhile, when the amidosulfuric acid component is a salt (a salt of amidosulfuric acid or an amidosulfuric acid derivative), the proportion may be based on the non-salt form [or the free form, for example, amidosulfuric acid, amidosulfuric acid derivative (e.g., a compound represented by the formula (4) in which M is a hydrogen atom), or the like] (the same applies to the following proportion of the amidosulfuric acid component).

The electrolyte salt and/or the amidosulfuric acid component may be present (contained) in an ion form in the electrolyte composition.

Part or the whole of the amidosulfuric acid component may be added to the electrolyte salt, or a product produced in the process of producing the electrolyte salt may be used as the amidosulfuric acid component.

The electrolyte composition may include another component, but may consist of substantially only the electrolyte salt and the amidosulfuric acid component.

<Solvent Composition and Non-Aqueous Electrolyte Solution>

A solvent composition includes: a sulfonylimide compound (1) as an electrolyte salt; an amidosulfuric acid component; and a solvent.

In the solvent composition, the electrolyte salt (such as the sulfonylimide compound (1) and another electrolyte) and the amidosulfuric acid component may be the components shown above as examples in the item of the electrolyte composition. Preferred aspects and the like are also the same as described above.

In the solvent composition, the electrolyte salt and/or the amidosulfuric acid component may be present (contained) in an ion form, and may be typically dissolved.

The solvent can be selected, as appropriate, according to the use or the like of the solvent composition. The solvent may be typically a non-aqueous solvent or an organic solvent, or may also be an aprotic solvent. The solvent may also be a solvent capable of dissolving the electrolyte salt and/or the amidosulfuric acid component. The solvent may also be a solvent having a relatively low polarity, and may also be, for example, a solvent (organic solvent) having a relative permittivity of 10 or less.

The solvent may have a boiling point of, for example, 50° C. or more (e.g., 60° C. or more, 70° C. or more), which depends on the use or the like of the solvent composition.

Specific examples of the solvent include carbonates such as a chain carbonate [e.g., a dialkyl carbonate (e.g., di $C_{1-4}$ alkyl carbonates such as dimethyl carbonate (DMC), ethyl methyl carbonate (EMC), and diethyl carbonate (DEC)), an alkylaryl carbonate (e.g., $C_{1-4}$ alkylphenyl carbonates such as methylphenyl carbonate), and a diaryl carbonate (e.g., diphenyl carbonate)], a cyclic carbonate [e.g., a saturated cyclic carbonate (e.g., alkylene carbonates (e.g., C2-6 alkylene carbonates) such as an ethylene carbonate, propylene carbonate, 2,3-dimethyl ethylene carbonate, and 1,2-butylene carbonate) and erythritan carbonate), an unsaturated cyclic carbonate (e.g., alkenylene carbonates such as vinylene carbonate, methylvinylene carbonate, and ethylvinylene carbonate; and 2-vinylethylene carbonate), and a fluorine-containing cyclic carbonate (e.g., fluoroethylene carbonate, 4,5-difluoroethylene carbonate, and trifluoropropylene carbonate); ethers such as chain ethers [e.g., an alkane diol dialkyl ether (e.g., ethylene glycol dimethyl ether and ethylene glycol diethyl ether), and a polyalkane diol dialkyl ether (e.g., triethylene glycol dimethyl ether and tetraethylene glycol dimethyl ether)] and cyclic ethers [e.g., tetrahydrofurans (e.g., tetrahydrofuran, 2-methyltetrahydrofuran, and 2,6-dimethyltetrahydrofuran), tetrahydropyrans (e.g., tetrahydropyran), dioxanes (e.g., 1,4-dioxane), dioxolanes (e.g., 1,3-dioxolane), and a crown ether]; esters (carboxylic acid esters) such as chain esters [e.g., an aromatic carboxylic acid ester (e.g., methyl benzoate and ethyl benzoate)] and cyclic esters [or lactones, e.g., γ-butyrolactone, γ-valerolactone, and δ-valerolactone]; phosphoric acid esters such as a phosphoric acid alkyl ester (e.g., trimethyl phosphate, ethyl dimethyl phosphate, diethyl methyl phosphate, and triethyl phosphate); nitriles such as an aliphatic nitrile (e.g., acetonitrile, propionitrile, methoxypropionitrile, glutaronitrile, adiponitrile, 2-methylglutaronitrile, valeronitrile, butyronitrile, and isobutyronitrile) and aromatic nitriles (e.g., benzonitrile and tolunitrile); sulfur-containing solvents such as sulfones (e.g., dimethyl sulfone, ethyl methyl sulfone, and diethyl sulfone) and sulfolanes (e.g., sulfolane, 3-methylsulfolane, and 2,4-dimethylsulfolane); and nitromethane, 1,3-dimethyl-2-imidazolidinone, 1,3-dimethyl-3,4,5,6-tetrahydro-2(1H)-pyrimidinone, and 3-methyl-2-oxazolidinone. These solvents may be used alone or in combination of two or more thereof.

Among these examples, the solvent is preferably carbonates, ethers, and esters, or the like, particularly preferably any of a chain carbonate (e.g., dimethyl carbonate, ethyl methyl carbonate, and diethyl carbonate), a cyclic carbonate (e.g., ethylene carbonate and propylene carbonate), a lactone (e.g., γ-butyrolactone and γ-valerolactone), or the like, particularly further preferably a chain carbonate (e.g., dimethyl carbonate, ethyl methyl carbonate, and diethyl carbonate).

The chain carbonate (e.g., dimethyl carbonate, ethyl methyl carbonate, and diethyl carbonate), the chain ether (e.g., ethylene glycol dimethyl ether), and the like are also solvents having a relative permittivity of 10 or less (further a boiling point of 50° C. or more) in many cases. Therefore, the solvent may be a solvent including (including at least) the chain carbonate, the chain ether, or the like.

In the other aspect of the present invention, as the solvent to be combined with the amidosulfuric acid component, a solvent may suitably be used that includes a solvent (organic solvent) having a relative permittivity of 10 or less. This solvent is suitable because the fluorine-containing sulfonylimide salt such as the sulfonylimide compound (1) (further, the fluorine-containing sulfonylimide salt combined with the amidosulfuric acid component) seems to be stable [for example, less likely to be decomposed (particularly, less likely to be decomposed even in a system including some water)] when combined with the organic solvent (e.g., a chain carbonate) having a relative permittivity of 10 or less.

When the solvent includes the solvent having a relative permittivity of 10 or less, the proportion of the solvent having a relative permittivity of 10 or less relative to the whole solvent is, for example, 10% by volume or more, 20% by volume or more, 30% by volume or more, 40% by volume or more, 50% by volume or more, 60% by volume or more, 70% by volume or more, 80% by volume or more, 90% by volume or more, 95% by volume or more, 99% by volume or more, 100% by volume (substantially only the solvent having a relative permittivity of 10 or less), or the like.

Particularly, when the solvent includes a chain carbonate, the solvent may consist of only the chain carbonate, or may also include another solvent [a solvent that is not a chain carbonate, e.g., a cyclic carbonate (such as ethylene carbonate and propylene carbonate)] in combination.

When the solvent includes a chain carbonate and another solvent in combination, the ratio therebetween can be selected, as appropriate, according to the desired characteristics or the like. The chain carbonate/another solvent (volume ratio) may be, for example, 99.9/0.1 to 1/99 (e.g., 99.8/0.2 to 10/90), preferably 99.5/0.5 to 20/80 (e.g., 99.3/0.7 to 30/70), more preferably 99/1 to 40/60 (e.g., 98.8/1.2 to 45/55), and may also be 99/1 to 20/80 (e.g., 98/2 to 25/75), 97/3 to 30/70 (e.g., 96/4 to 35/65), 95/5 to 40/60, 93/7 to 45/55, 95/5 to 50/50, 93/7 to 55/45, 90/10 to 60/40.

The solvent composition may suitably be used for an electrolyte solution. In the use of the solvent composition for an electrolyte solution, the solvent composition only has to constitute at least part of the electrolyte solution. For example, the solvent composition may be used as it is as the electrolyte solution, or may also be used as a material of the electrolyte solution. Therefore, the solvent composition can also be referred to as an electrolyte solution (non-aqueous electrolyte solution).

Here, as an electrolyte salt constituting an electrolyte solution, various electrolyte salts prepared according to the kinds or the like of batteries applied are known. The study of the present inventors, however, has found that the use of the fluorine-containing sulfonylimide salt such as the sulfonylimide compound (1) among these electrolytes may cause phenomena such as a decrease of the pH in the system over time, decomposition of the solvent, and corrosion of the container containing the electrolyte solution. Further, the study of the present inventors has also found that these phenomena may be easily generated when the fluorine-containing sulfonylimide salt is combined with the amidosulfuric acid component.

As a result of the study to find a cause of these phenomena, the present inventors presumed, as the cause, decomposition of the fluorine-containing sulfonylimide salt itself (and generation of an acid component such as hydrogen fluoride due to the decomposition), and also presumed, as a cause of this decomposition, the presence of a small amount of water mixed into the system.

Under these presumptions, the present inventors have studied to reduce water mixed into the system, but reducing the water at a high level has required, in some cases, complicated conditions such as selecting, as appropriate, components to be used and preparation conditions.

Under these circumstances, the present inventors have studied whether the problems (a decrease in the pH, decomposition of the solvent, corrosion of the container, and the like) specific to the use of the fluorine-containing sulfonylimide salt can be solved on the basis of the idea that is completely different from the idea of reducing the water mixed into the system. As a result, the present inventors have found that selecting, as the solvent to be combined, a solvent having a relative permittivity of 10 or less can unexpectedly solve the problems (can solve the problems particularly even when the system includes the amidosulfuric acid component or some water).

Specifically, in the other aspect of the present invention, the solvent composition (e.g., a material of an electrolyte solution) can be efficiently stabilized. For example, such a solvent composition can efficiently reduce the decomposition of the fluorine-containing sulfonylimide salt, the decrease in the pH, the decomposition of the solvent, and the like, thereby efficiently reducing, for example, the corrosion of the container. The solvent composition can exhibit the effects even when the proportion or the concentration of the electrolyte salt (the fluorine-containing sulfonylimide salt such as the sulfonylimide compound (1)) is high (e.g., 5% by mass or more).

When the solvent composition is used as a material of an electrolyte solution, the electrolyte solution may be prepared, for example, by further mixing the solvent composition with a solvent (further diluting the solvent composition with a solvent). Examples of the solvent (the solvent to be mixed with or used for dilution) include the same solvents described above, and a solvent that is the same as or different from the solvent constituting the solvent composition may be used.

In the solvent composition, the proportion (concentration) of the electrolyte salt (or the sulfonylimide compound (1)) can be selected, as appropriate, according to the use form of the solvent composition (use of the solvent composition as it is as an electrolyte solution, use of the solvent composition as a material of an electrolyte solution, or the like) or the like. The proportion of the electrolyte salt relative to the whole solvent composition is, for example, 0.02 ppm by mass or more (e.g., 0.1 ppm by mass to 99% by mass), preferably 0.1% by mass or more (e.g., 0.5% by mass to 80% by mass), more preferably around 1% by mass or more (e.g., 5% by mass to 75% by mass, 10% by mass to 75% by mass).

Particularly, for example, when the solvent composition is used as a material of an electrolyte solution, the proportion of the electrolyte salt may be a relatively high proportion or high concentration [the proportion of the electrolyte salt relative to the whole solvent composition is, for example, 5% by mass or more (e.g., 5% by mass to 90% by mass), preferably 10% by mass or more (e.g., 10% by mass to 90% by mass, 10% by mass to 80% by mass), more preferably 20% by mass or more (e.g., 20% by mass to 85% by mass, 20% by mass to 75% by mass), particularly 30% by mass or more (e.g., 30% by mass to 80% by mass, 30% by mass to 70% by mass), most preferably around 35% by mass or more (e.g., 35% by mass to 80% by mass)]. For example, when the solvent composition is used as it is as an electrolyte solution, the proportion of electrolyte salt relative to the entire solvent composition (or the electrolyte solution) may be 1% by mass or more (e.g., 3% by mass to 70% by mass), preferably 5% by mass or more (e.g., 8% by mass to 50% by mass), more preferably around 10% by mass or more (e.g., 12% by mass to 45% by mass).

In the solvent composition, the proportion (concentration) of the amidosulfuric acid component can be selected, as appropriate, according to the use form of the solvent composition (use of the solvent composition as it is as an electrolyte solution, use of the solvent composition as a material of an electrolyte solution, or the like) or the like. The proportion of the amidosulfuric acid component relative to the whole solvent composition of, for example, 0.01 ppm by mass or more (e.g., 0.02 ppm by mass to 10000 ppm by mass), preferably 0.03 ppm by mass or more (e.g., 0.04 ppm by mass to 5000 ppm by mass), more preferably around 0.05 ppm by mass or more (e.g., 0.05 ppm by mass to 1000 ppm by mass), and may also be 0.1 ppm by mass or more (e.g., 0.5 ppm by mass or more), 1 ppm by mass or more (e.g., 3 ppm by mass to 10000 ppm by mass), 5 ppm by mass or more (e.g., 5 ppm by mass to 5000 ppm by mass), 10 ppm by mass or more [e.g., 50 ppm by mass or more (e.g., 50 ppm by mass to 3000 ppm by mass)], 100 ppm by mass or more (e.g., 100 ppm by mass to 2000 ppm by mass), 300 ppm by mass or more (e.g., 300 ppm by mass to 1500 ppm by mass), or the like.

Particularly, for example, when the solvent composition is used as a material of an electrolyte solution, the proportion of the amidosulfuric acid component may be a relatively high proportion or high concentration [the proportion of the amidosulfuric acid component relative to the whole solvent composition may be, for example, 100 ppm by mass or more (e.g., 100 ppm by mass to 3000 ppm by mass), preferably 300 ppm by mass or more (e.g., 300 ppm by mass to 2000 ppm by mass), more preferably around 500 ppm by mass or more (e.g., 500 ppm by mass to 1000 ppm by mass)]. For example, when the solvent composition is used as it is as an electrolyte solution, the proportion of the amidosulfuric acid component relative to the whole solvent composition (or electrolyte solution) may be 1 ppm by mass or more [e.g., 3 ppm by mass to 3000 ppm by mass, preferably 30 ppm by mass or more (e.g., 50 ppm by mass to 2000 ppm by mass), more preferably around 100 ppm by mass or more (e.g., 200 ppm by mass to 1500 ppm by mass)].

Depending on the use, the solvent composition may also be typically a non-aqueous solvent composition (solvent composition including substantially no water). In this case, the non-aqueous solvent composition can also be referred to as a non-aqueous electrolyte solution. In the present invention, for example, constituting the solvent with the solvent having a relative permittivity of 10 or less seems to enable the composition (solvent composition) that even includes some water to easily and efficiently prevent or reduce decomposition of the electrolyte salt (e.g., the fluorine-containing sulfonylimide salt), adverse effects accompanying the decomposition [e.g., a decrease of the concentration of the electrolyte and adverse effects by a decomposition component (e.g., a decrease of the pH accompanying generation of hydrogen fluoride and decomposition of the solvent)], and the like.

This solvent composition (solvent composition including water) may have, as a finite quantity, a proportion of water of, for example, 0.1 ppm by mass or more (e.g., 0.2 ppm by mass or more), 0.3 ppm by mass or more (e.g., 0.4 ppm by mass or more) in one preferred embodiment, or the like, and may also have a proportion of 0.5 ppm by mass or more, 0.7 ppm by mass or more, 0.8 ppm by mass or more, 1 ppm by mass or more, 1.5 ppm by mass or more, 2 ppm by mass or more, 3 ppm by mass or more, 5 ppm by mass or more, 7 ppm by mass or more, 10 ppm by mass or more, or the like.

The upper limit value of the proportion of water in the solvent composition is not particularly limited, and may be, for example, 3000 ppm by mass, 1000 ppm by mass, 900 ppm by mass, 800 ppm by mass, 700 ppm by mass, 600 ppm by mass, 500 ppm by mass, 400 ppm by mass, 300 ppm by mass, 200 ppm by mass, 100 ppm by mass, 50 ppm by mass, or the like.

Depending on the use, the solvent composition may also be a composition including substantially no protic organic solvent. Particularly, the solvent composition may have a proportion of methanol and/or ethanol of 10000 ppm by mass or less (e.g., 0.1 ppm by mass, or detection limit to 10000 ppm by mass), 1000 ppm by mass or less in one preferred embodiment, 100 ppm by mass or less in one further preferred embodiment, 50 ppm by mass or less in one particularly preferred embodiment, 30 ppm by mass or less in one most preferred embodiment.

The solvent composition may include a specific element or ion (a fluorine ion, a chlorine ion, a sulfate ion, or the like), or may include substantially no specific element or ion depending on the use or the like thereof.

The solvent composition may also include another component (a component other than the electrolyte, the amidosulfuric acid component, and the solvent) as necessary, without any deterioration. The other component can be selected, as appropriate, according to the use or the like of the solvent composition. Examples of the other component include additives [e.g., acid anhydrides (such as succinic anhydride, glutaric anhydride, and maleic anhydride)] for improving or increasing the battery characteristics. These other components may be used alone or in combination of two or more thereof.

When the solvent composition includes the other component, the proportion of the other component can be selected, as appropriate, according to the kind, the purpose, or the like thereof. The proportion of the other component in the solvent composition is, for example, 10% by mass or less, 8% by mass or less, 5% by mass or less, or 3% by mass or less.

The pH of the solvent composition can be selected, as appropriate, according to the kind or the like of the electrolyte, is not particularly limited, and is, for example, 3 to 12, preferably 4 to 11, more preferably 4 to 9.

With this pH, decomposition of a constituent component (e.g., the solvent) of the solvent composition, corrosion of the storage container of the solvent composition (electrolyte solution) (further, generation of impurities accompanying the corrosion), and the like can be efficiently easily reduced. The pH not only refers to the pH in preparation of the solvent composition, but may also refer to the pH after a lapse of a prescribed time. In the present invention, selecting a chain carbonate as described above seems to enable the solvent composition to efficiently reduce the decrease in the pH over time and to maintain the pH described above over a long period.

<Method of Storing or Transporting Solvent Composition or Container Containing Solvent Composition>

The solvent composition (e.g., a material of an electrolyte solution) may be contained (stored) in a container. The solvent composition contained in a container can be readily stored or transported. Therefore, the present invention also encompasses a container containing the solvent composition (a container filled with the solvent composition), and a method of storing and a method of transporting the solvent composition or the container. Particularly, despite the fact that the solvent composition includes the fluorine-containing sulfonylimide salt such as the sulfonylimide compound (1) (and further includes the amidosulfuric acid component) (and further includes a prescribed amount of water), the solvent composition is stable and is therefore suitable for storage and transportation.

This stabilization is easily and efficiently achieved when the solvent is a solvent (e.g., a chain carbonate) having a relative permittivity of 10 or less. Therefore, this storage or transportation method can also be referred to as a method of storing or transporting the solvent composition that includes the fluorine-containing sulfonylimide salt such as the sulfonylimide compound (1) (and further includes the amidosulfuric acid component and a prescribed water content) and the solvent including the solvent having a relative permittivity of 10 or less.

The material of the container (the storage container) (the material of an inner portion of the container, the material of a portion of the container to be in contact with the contents (solvent composition)) is not particularly limited, and examples thereof include a metal (e.g., stainless steel and hastelloy), a resin [e.g., an olefin-based resin (e.g., polyethylene and polypropylene) and a fluorine-based resin (e.g., polytetrafluoroethylene (PTFE))], and glass.

Alternatively, the container formed of a metal material described above may have an inner surface coated with a resin. The resin used for the coating is not particularly limited, and examples thereof include a fluorine-based resin (e.g., polytetrafluoroethylene (PTFE), a tetrafluoroethylene-perfluoroalkyl vinyl ether copolymer (PFA), and a tetrafluoroethylene-hexafluoropropylene copolymer (FEP)) and an olefin-based resin (e.g., polypropylene).

In the solvent composition, the solvent is, for example, the solvent (e.g., a chain carbonate) having a relative permittivity of 10 or less. This allows efficient reduction in corrosion (e.g., corrosion over time during long-period storage or transportation), despite the fact that the solvent composition includes the fluorine-containing sulfonylimide salt such as the sulfonylimide compound (1) and even when the container is made of a material (e.g., stainless steel) described above.

The container can be hermetically sealed (closed system) in one preferred embodiment, and examples of the means for enabling the container to be hermetically sealed include providing a portion of the container with a valve.

In the container (the interior of the container), a portion (a gas phase portion, a headspace) other than the solvent composition may be an active gas (e.g., air and oxygen), or may also be an inert gas [e.g., a rare gas (such as helium) and nitrogen].

The gas phase portion (headspace) of the container may be preferably an inert gas (may be filled with an inert gas). Further, the gas phase portion (filling gas) may be dried (for example, may be dried air). From this viewpoint, the gas phase portion (a gas filling the gas phase portion) may have a dew point which is a relatively low temperature, e.g., 0° C. or less, −10° C. or less, or −20° C. or less.

The temperature of the solvent composition is not particularly limited (e.g., temperature during storage or transportation), and may be, for example, 60° C. or less (e.g., 50° C. or less, 40° C. or less), and be −40° C. or more (e.g., −30° C. or more, −20° C. or more, −10° C. or more, and 0° C. or more). Adjusting the temperature as appropriate can efficiently reduce solidification and decomposition (e.g., decomposition when a solvent is further added to the material of the electrolyte solution).

<Use of Electrolyte Composition and Solvent Composition>

The solvent composition (electrolyte composition) is suitable for an electrolyte solution as described above. The electrolyte solution only has to include the electrolyte composition or the solvent composition (the electrolyte salt, the amidosulfuric acid component, and the solvent), and may be the solvent composition itself or may include the solvent composition (the solvent composition as a material of the electrolyte solution) and a solvent.

In the electrolyte solution, the kinds, the proportion, and the like of components are as described above.

The electrolyte solution (solvent composition) can be used in, for example, a battery (a battery having a charge and discharge mechanism) or an electric storage (electrochemical) device (or a material of an ion conductor constituting these battery and device). Specifically, the electrolyte solution can be used as an electrolyte solution constituting, for example, a primary battery, a secondary battery (e.g., a lithium (ion) secondary battery), a fuel battery, an electrolytic capacitor, an electric double layer capacitor, a solar battery, and an electrochromic display device.

Hereinafter, the description will be made with reference to a battery (particularly a lithium ion secondary battery) as an example. The battery (the battery including the electrolyte solution) includes at least a positive electrode and a negative electrode.

[Positive Electrode]

The positive electrode may include, for example, a positive electrode current collector carrying a positive electrode mixture (positive electrode active material composition) including a positive electrode active material. The positive electrode may be typically formed in a sheet shape.

The positive electrode active material only has to be capable of storing and discharging various ions (such as a lithium ion and a sodium ion), and, for example, a positive electrode active material can be used that is used in a known secondary battery (such as a lithium ion secondary battery and a sodium ion secondary battery).

The active material of the lithium ion secondary battery can be, for example, transition metal oxides such as lithium cobalt oxide, lithium nickel oxide, lithium manganese oxide, and a ternary oxide represented by $LiNi_{1-x-y}Co_xMn_yO_2$ or $LiNi_{1-x-y}Co_xAl_yO_2$ (where $0 \leq x \leq 1$ and $0 \leq y \leq 1$), compounds each having an olivine structure such as $LiAPO_4$ (where A is Fe, Mn, Ni, or Co), a solid solution material containing a plurality of transition metals (a solid solution of an electrochemically inactive layered $Li_2MnO_3$ and an electrochemically active layered $LiMO_2$ (where M is a transition metal such as Co or Ni), $LiCo_xMn_{1-x}O_2$ (where $0 \le x \le 1$), $LiNi_xMn_{1-x}O_2$ (where $0 \le x \le 1$), compounds having a fluorinated olivine structure, such as $Li_2APO_4F$ (where A is Fe, Mn, Ni, or Co), and sulfur. These active materials may be used alone or in combination of two or more thereof.

Examples of the active material of the sodium ion secondary battery include $NaNiO_2$, $NaCoO_2$, $NaMnO_2$, $NaVO_2$, $NaFeO_2$, $Na(Ni_xMn_{1-X})O_2$ (where $0<X<1$), $Na(Fe_xMn_{1-X})O_2$ (where $0<X<1$), $NaVPO_4F$, $Na_2FePO_4F$, and $Na_3V_2(PO_4)_3$. These active materials may be used alone or in combination of two or more thereof.

The amount of the positive electrode active material used may be, relative to 100 parts by mass of the positive electrode mixture, for example, 75 parts by mass or more (e.g., 80 parts by mass to 99 parts by mass), preferably 85 parts by mass or more, more preferably 90 parts by mass or more, and may also be 99 parts by mass or less, 98 parts by mass or less, or 97 parts by mass or less.

The positive electrode mixture may further include a conductive auxiliary agent (conductive material), a binder, a solvent, or the like.

The auxiliary agent is not particularly limited, and examples thereof include carbon black (e.g., acetylene black), graphite, a carbon nanotube (e.g., a single-walled carbon nanotube and a multi-walled carbon nanotube), a carbon fiber (e.g., a vapor-grown carbon fiber), and a metal powder material. These conductive auxiliary agents may be used alone or in combination of two or more thereof.

Examples of the binder include fluorine-based resins such as polyvinylidene fluoride and polytetrafluoroethylene; synthetic rubbers such as a styrene-butadiene rubber and a nitrile-butadiene rubber; polyamide-based resins such as polyamideimide; polyolefin-based resins such as polyethylene and polypropylene; a poly(meth)acrylic resin; a polyacrylic acid; and cellulose-based resins such as carboxymethyl cellulose. These binders may be used alone or in combination of two or more thereof. The binder may be dissolved in a solvent or may be dispersed in a solvent when used.

The amount of the conductive auxiliary agent and the binder added may be adjusted as appropriate in view of the intended use (e.g., focusing on outputs or energy), the ion conductivity, or any other characteristic of the battery.

For example, the content of the conductive auxiliary agent when used in the positive electrode mixture is, relative to 100% by mass of the positive electrode mixture, preferably in a range of 0.1% by mass to 10% by mass, more preferably 0.5% by mass to 10% by mass, yet more preferably 1% by mass to 10% by mass.

The content of the binder when used in the positive electrode mixture is, relative to 100% by mass of the positive electrode mixture, preferably 0.1% by mass to 10% by mass, more preferably 0.5% by mass to 9% by mass, yet more preferably 1% by mass to 8% by mass.

The solvent (the solvent for dispersing or dissolving the positive electrode mixture) is not particularly limited, and known materials can be used. Examples of the solvent include N-methylpyrrolidone, dimethylformamide, dimethylacetamide, methyl ethyl ketone, tetrahydrofuran, acetone, ethanol, ethyl acetate, and water. These solvents may be used alone or in combination of two or more thereof. The amount of the solvent used is not particularly limited, and may be determined, as appropriate, in accordance with the production method and the material used.

The material of the positive electrode current collector is not particularly limited. For example, a conductive metal such as aluminum, an aluminum alloy, stainless steel (SUS), or titanium may be used.

The method of producing the method of producing the positive electrode is not particularly limited, and examples thereof include: (i) a method in which a positive electrode current collector is coated with a positive electrode active material composition by a doctor blade technique, or is immersed in a positive electrode active material composition, and is then dried, the positive electrode active material composition being obtained by dissolving or dispersing a positive electrode mixture in a dispersion solvent; (ii) a method in which a sheet obtained by kneading, molding, and drying a positive electrode active material composition is bonded to a positive electrode current collector via a conductive adhesive, and is then pressed and dried; and (iii) a method in which a positive electrode active material composition containing a liquid lubricant is applied or casted onto a positive electrode current collector to mold into a desired shape, the liquid lubricant is then removed, and the resultant composition is stretched monoaxially or multiaxially. The positive electrode mixture layer may be pressed as necessary after drying.

[Negative Electrode]

The negative electrode includes, for example, a negative electrode current collector that carries a negative electrode mixture (negative electrode active material composition) including a negative electrode active material. The negative electrode may be typically formed in a sheet shape.

As the negative electrode active material, any known negative electrode active material of various batteries (e.g., a lithium secondary battery) may be used as long as being capable of storing and discharging ions (e.g., lithium ions).

A specific negative electrode active material can be graphite materials such as artificial graphite and natural graphite, a mesophase calcined body made from coal or petroleum pitches, carbon materials such as non-graphitizable carbon, a Si-based negative electrode material such as Si, a Si alloy, and SiO, a Sn-based negative electrode material such as a Sn alloy, and lithium alloys such as a lithium metal and a lithium-aluminum alloy. These negative electrode active materials may be used alone or in combination of two or more thereof.

The negative electrode mixture may further include a conductive auxiliary agent (conductive material), a binder, a solvent, or the like. As the conductive auxiliary agent, the binder, the solvent, and the like, the same components as described above can be used. The proportion and the like of the components used is also the same as described above.

The material of the negative electrode current collector can be conductive metals such as copper, iron, nickel, silver, and stainless steel (SUS).

As the method of producing a negative electrode, the same method as the method of producing a positive electrode can be employed.

[Separator]

The battery may include a separator. The separator is disposed so as to separate between the positive electrode and the negative electrode. The separator is not particularly limited, and any known separators can be used in the present invention. Specific examples of the separator include a porous sheet (e.g., a polyolefin-based microporous separator and a cellulose-based separator) formed of a polymer capable of absorbing and retaining a non-aqueous electrolyte solution, a nonwoven fabric separator, and a porous metal body.

Examples of the material of the porous sheet include polyethylene, polypropylene, and a laminate having a three layer structure of polypropylene, polyethylene, and polypropylene.

Examples of the material of the nonwoven fabric separator include cotton, rayon, acetate, nylon, polyester, polypropylene, polyethylene, polyimide, aramid, and glass. The materials listed above may be used alone or in combination of two or more thereof according to the mechanical strength or the like required.

[Battery Exterior Material]

The battery (battery element) including the electrolyte solution, the positive electrode, the negative electrode, (further the separator), and the like is typically housed in a battery exterior material to protect the battery element from external impact, environmental degradation, and the like during use of the battery. The material of the battery exterior material is not particularly limited, and any known exterior materials can be used.

The shape of the battery (a lithium ion secondary battery or the like) is not particularly limited. Any shape, such as a cylindrical, rectangular, laminated, or coin shape or a large size, typically known as a lithium ion secondary battery shape may be employed. In use as a high-voltage (e.g., tens to hundreds of volts) power supply to be mounted in an electric vehicle or a hybrid electric vehicle, for example, individual batteries may be connected in series into a battery module.

The rated charge voltage of the secondary battery (such as a lithium ion secondary battery) is not particularly limited, and may be 3.6 V or more, preferably 4.1 V or more, more preferably 4.2 V or more (e.g., more than 4.2 V), and may also be 4.3 V or more (e.g., 4.35 V or more). The higher the rated charge voltage, the more the energy density can be increased. From the viewpoint of safety, however, the rated charge voltage may be 4.6 V or less (e.g., 4.5 V or less).

In the present invention, the electrolyte solution constituted of the solvent composition (or the electrolyte composition) enables, compared with the electrolyte solution including no amidosulfuric acid component, the reduction in the resistance of the battery or device applied, and, due to the reduction, the improvement of or the increase in the performance {e.g., a charge and discharge characteristic, a storage characteristic [e.g., a high-temperature storage characteristic (e.g., a storage characteristic at 40° C. or more and 50° C. or more)], and a cycle characteristic} of the battery or device applied.

Thus, the amidosulfuric acid component can also be referred to as an additive (an additive for increasing or improving the desired characteristics) for the electrolyte solution (an additive or the like for a novel electrolyte solution can be provided). Specifically, the amidosulfuric acid component as a specific component can be used as an additive for the electrolyte solution and the like, and the amidosulfuric acid component used in this form can exhibit the functions (e.g., the function of reducing the resistance and improvement of the battery performance) described above.

Therefore, the present invention includes: (i) an additive [e.g., an agent (resistance reducer) for reducing the resistance, and an agent for improving or increasing the performance (e.g., at least one characteristic selected from a charge and discharge characteristic, a storage characteristic, or a cycle characteristic)] for the electrolyte solution, the additive being constituted of the amidosulfuric acid component (including the amidosulfuric acid component); (ii) a method in which the amidosulfuric acid component is caused to be present in the electrolyte solution to reduce the resistance; and (iii) a method in which the amidosulfuric acid component is caused to be present in the electrolyte solution to increase or improve the performance (e.g., at least one characteristic selected from a charge and discharge characteristic, a storage characteristic, or a cycle characteristic), for example.

These functions (e.g., the effect of reducing the resistance and the effect of increasing the performance) can be exhibited under a wide range of conditions as long as the electrolyte solution constituted of the solvent composition (or the electrolyte composition) is used. These functions, however, can be efficiently exhibited particularly at low temperatures [e.g., 10° C. or less (e.g., 5° C. or less), 0° C. or less (e.g., −2° C. or less), −5° C. or less (e.g., −7° C. or less), −10° C. or less (e.g., −12° C. or less), −15° C. or less (e.g., −18° C. or less), −20° C. or less (e.g., −22° C. or less), −25° C. or less (e.g., −22° C. or less), or −30° C. or less].

Therefore, the additive and the methods may be applied particularly at these temperatures (the additive and the methods may also be, for example, an agent for reducing the resistance at the low temperatures specified above, a method of reducing the resistance at the low temperatures specified above, and a method of increasing or improving the performance (e.g., a charge and discharge characteristic) at the low temperatures specified above).

In the other aspect of the present invention, the selection of the solvent having a relative permittivity of 10 or less (e.g., a chain carbonate) enables the reduction in the problems (such as decomposition of the fluorine-containing sulfonylimide salt, a decrease in the pH, corrosion of the container, and decomposition of the solvent) specific to the fluorine-containing sulfonylimide salt such as the sulfonylimide compound (1) (further, the fluorine-containing sulfonylimide salt combined with the amidosulfuric acid component).

Thus, the solvent having a relative permittivity of 10 or less can also be referred to as an additive capable of solving these specific problems (e.g., an agent for reducing the decomposition of the fluorine-containing sulfonylimide salt such as the sulfonylimide compound (1)).

Therefore, the present invention also includes: (i) an agent that is an additive for reducing, in the composition including the fluorine-containing sulfonylimide salt such as the sulfonylimide compound (1) and a solvent, at least one selected from decomposition of the fluorine-containing sulfonylimide salt, a decrease in the pH, or corrosion of the container that contains the composition, the agent (i) including the solvent having a relative permittivity of 10 or less; and (ii) a method of reducing, in the composition including the fluorine-containing sulfonylimide salt and the solvent, at least one selected from decomposition of the fluorine-containing sulfonylimide salt, a decrease in the pH, or corrosion of the container that contains the composition, the method including adding, to the solvent, the solvent having a relative permittivity of 10 or less.

In these agent and method, the composition may include a finite quantity of water (e.g., water at a concentration of 0.1 ppm by mass or more).

EXAMPLES

The following describes the present invention in detail with reference to the examples. The present invention, however, is not limited by these examples.

Example 1 Series

The analysis and evaluation methods performed in Example 1 series are as follows.

[$^{19}$F-NMR Measurement]

The $^{19}$F-NMR measurement was performed using "Unity Plus-400" manufactured by Varian, Inc. (internal standard substance: benzenesulfonyl fluoride, integration number: 16 times).

[Ion Chromatography]

The solvent composition was diluted with ultrapure water (more than 18.2 Ω·cm) 1000 folds to prepare a measurement solution, which was measured using ion chromatography system ICS-3000 (manufactured by Nippon Dionex K.K.).
  Separation mode: Ion exchange
  Eluent: 7 mM to 20 mM aqueous KOH solution
  Detector: Conductivity detector
  Column: Anion analysis column Ion PAC AS-17C (manufactured by Nippon Dionex K.K.)

[Resistance Value]

A produced battery was charged at 0.1 C (3 mA) for 90 minutes, and one side of its sealing portion was opened and vacuum-sealed again for degassing. Thereafter, the battery was left to stand at an ordinary temperature for 3 days, subjected to constant current constant voltage charge at 4.2 V and 0.5 C (15 mA) for 5 hours, subjected to constant current discharge at 0.2 C (6 mA) with a cutoff voltage of 2.75 V, further charged under the same conditions, and subjected to constant current discharge at 1 C (30 mA) with a cutoff voltage of 2.75 V. This procedure was defined as an aging process of the cell. The aged cell was subjected to constant current charge at 1 C (30 mA) for 30 minutes to a charge depth of 50%, the impedance was measured at 25° C. and −30° C. and from 1 GHz to 10 mHz, and the real-axis resistance value at a frequency at which an arc starts to appear was measured. Then, from the obtained result, the resistance decrease rate with respect to a reference example (the case of including no amidosulfuric acid component) [(resistance value of reference example−resistance value of example)/resistance value of reference example×100] was obtained.

[Charge and Discharge Capacity]

The cell that had undergone the resistance value measurement was discharged at 25° C. and 0.2 C (6 mA) to 2.75 V and then subjected to constant current constant voltage charge at 25° C., 4.2 V, and 1 C (30 mA) with a cutoff current of 0.6 mA. The charged cell was left to stand at −20° C. for 3 hours and then measured for constant current discharge capacity at −20° C. and 1 C (30 mA) with a cutoff voltage of 2.75 V.

The cell that had undergone the discharge capacity measurement at −20° C. was left to stand at an ordinary temperature for 3 hours, and subjected to constant current discharge at 25° C. and 0.2 C (6 mA) with a cutoff voltage of 2.75 V. The discharged cell was left to stand at −20° C. for 3 hours and then measured for constant current charge capacity at −20° C. and 1 C (30 mA) with a cutoff voltage of 4.2 V.

Then, from the results obtained, the capacity increase rate relative to the reference example (the case of including no amidosulfuric acid component) [(capacity of example−capacity of reference example)/capacity of reference example×100] was obtained.

[High-Temperature Storage Characteristic]

The cell aged by the method described in the item [Resistance Value] was subjected to constant voltage charge at 25° C., 4.2 V, and 1 C (30 mA) with a cutoff current of 0.6 mA. Then, the discharge capacity of the cell at 25° C. and 0.2 C (6 mA) with a cutoff voltage of 2.75 V was measured and defined as initial capacity. The cell that had undergone the initial capacity measurement was charged at 25° C., 4.2 V, and 1C (30 mA) with a cutoff time of 3 hours, measured for circuit voltage after the charge, and stored in a constant temperature bath at 60° C. for 2 weeks. The cell that had undergone the storage was left to stand at 25° C. for 3 hours and then measured for circuit voltage. The cell that had undergone the circuit voltage measurement was discharged at 25° C. and 1 C (30 mA) with a cutoff voltage of 2.75 V and then measured for remaining capacity. The cell that had undergone the remaining capacity measurement was charged at 25° C., 4.2 V, and 1 C (30 mA) with a cutoff current of 0.6 mA, discharged at 0.2 C (6 mA) with a cutoff voltage of 2.75 V, and measured for recovery capacity at 0.2 C. Further, the cell was subjected to the same charge, then subjected to discharge at 2 C (60 mA) with a cutoff voltage of 2.75 V, and measured for recovery capacity at 2 C.

Then, the capacity retention rate and the decrease in the voltage were determined as follows.

Capacity retention rate: the capacity retention rate (recovery capacity/initial capacity×100) was calculated from the initial capacity and the recovery capacity measured at each discharge current.

Decrease in voltage: the decrease in voltage was calculated as the difference ΔV of the circuit voltage between before and after the leaving to stand was calculated.

[Cycle at 45° C.]

The cell aged by the method described in the item [Resistance Value] was subjected to 300-cycle charge and discharge in a 45° C. environment under the following charge and discharge conditions.

(Charge and Discharge Conditions)
  Charge: 4.2 V, 1 C (30 mA), and cutoff current of 0.6 mA
  Charge rest: 10 minutes
  Discharge: 30 mA and cutoff voltage of 2.75 V
  Discharge rest: 10 minutes Then, the capacity retention rate after the 300-cycle charge and discharge was obtained as follows. The 300-cycle capacity retention rate (discharge capacity at 300th cycle/discharge capacity at first cycle)×100 was calculated from the values of the discharge capacity at the first cycle and the discharge capacity at the 300th cycle.

Example 1-1

[Electrolyte Composition and Solvent Composition (Electrolyte Solution)]

By the method described in Comparative Example 1 of Japanese Unexamined Patent Publication No. 2018-035054, lithium bis(fluorosulfonyl)imide (LiFSI) was synthesized. The obtained LiFSI was dissolved in ethyl methyl carbonate (EMC) as the solvent having a relative permittivity of 10 or less, to give an EMC solution including LiFSI at a concentration of 40% by mass. The concentration of LiFSI was measured by $^{19}$F-NMR (the same applies hereinafter).

To the EMC solution thus obtained, amidosulfuric acid was added, and the EMC solution was stirred for 1 day and filtered with a membrane filter. To the filtered EMC solution, LiPF$_6$, ethylene carbonate (EC), and EMC were added, to give a solvent composition (composition having a volume ratio EC/EMC of 3/7) including, as the electrolyte salt, LiFSI at a concentration of 0.6 M and LiPF$_6$ at a concentration of 0.6 M. The electrolyte was dissolved in the solvent composition, and an undissolved residue was not observed by visual inspection.

The obtained solvent composition was analyzed by ion chromatography and found to include, as the amidosulfuric acid component, amidosulfuric acid at a concentration of 6 ppm by mass.

As a result of the analysis by ion chromatography, the solvent composition was found to be a solvent composition (having EC/EMC (volume ratio) of 3/7) including LiFSI at a concentration of 0.6 M (9.3% by mass), LiPF$_6$ at a concentration of 0.6 M (7.5% by mass), and amidosulfuric acid (ion) at a concentration of 6 ppm by mass (36 ppm by mass relative to the total amount of the electrolyte salt and the amidosulfuric acid component).

[Laminate Battery]

A ternary positive electrode active material (LiNi$_{1/3}$Co$_{1/3}$Mn$_{1/3}$O$_2$ manufactured by Umicore S.A.), acetylene black ("DENKA BLACK" manufactured by Denka Company Limited), graphite ("SP270" manufactured by Nippon Graphite Industries, Co., Ltd.), and a polyvinylidene fluoride resin (PVdF, "#1120" manufactured by Kureha Battery Materials Japan Co., Ltd.) were weighed at a mass ratio of 93/2/2/3 and dispersed in N-methylpyrrolidone (NMP) to prepare a slurry. The prepared slurry was applied to one surface of an aluminum foil, dried, and roll-pressed to produce a positive electrode.

An aqueous slurry was prepared that had a composition of graphite (mixture of "SMG" manufactured by Hitachi Chemical Company, Ltd. and "SFG15" manufactured by Timcal Ltd. at a mass ratio of 85/15), a styrene butadiene rubber (SBR, "TRD2101" manufactured by JSR Corporation), and carboxymethyl cellulose (CMC, "2200" manufactured by Daicel Corporation) at a mass ratio of 97.3/1.5/1.2. The aqueous slurry was applied to one surface of a copper foil, dried, and roll-pressed to produce a negative electrode.

The obtained positive and negative electrodes were cut, a polar lead was ultrasonically welded to the cut positive and negative electrodes, which were disposed opposite to each other with a 16-μm polyethylene (PE) separator interposed therebetween, and the electrodes and the separator were put in an exterior package and sealed at three sides by lamination. The solvent composition in an amount of 700 μL was added as it was as an electrolyte solution into the exterior package through the unsealed side. Thus, a laminate battery with 4.2 V and 30 mAh was produced. Table 1 shows the results of measuring and evaluating the characteristics of the obtained battery.

Example 1-2

A solvent composition was obtained in the same manner as in Example 1-1 except that the amount of amidosulfuric acid added to the solvent composition was changed. The electrolyte was dissolved in the solvent composition, and an undissolved residue was not observed by visual inspection.

The obtained solvent composition was analyzed by ion chromatography and found to include amidosulfuric acid at a concentration of 282 ppm by mass.

As a result of the analysis by ion chromatography, the solvent composition was found to be a solvent composition (having EC/EMC (volume ratio) of 3/7) including LiFSI at a concentration of 0.6 M (9.3% by mass), LiPF$_6$ at a concentration of 0.6 M (7.5% by mass), and amidosulfuric acid (ion) at a concentration of 282 ppm by mass (1680 ppm by mass relative to the total amount of the electrolyte salt and the amidosulfuric acid component).

Then, using the obtained solvent composition, a laminate battery was produced in the same manner as in Example 1-1. Table 1 shows the results of measuring and evaluating the characteristics of the battery.

Example 1-3

A solvent composition was obtained in the same manner as in Example 1-1 except that lithium amidosulfate was used in place of amidosulfuric acid and the amount thereof added was changed. The electrolyte was dissolved in the solvent composition, and an undissolved residue was not observed by visual inspection.

Used as the lithium amidosulfate was one prepared by making, with pure water, amidosulfuric acid into a slurry, introducing lithium hydroxide monohydrate into the slurry under stirring while monitoring generation of heat, filtering out insoluble matter, and then drying the filtrate at 80° C. under reduced pressure. The obtained lithium amidosulfate was analyzed by XRD (X-ray diffraction) and found to include no impurities.

The obtained solvent composition was analyzed by ion chromatography and found to include lithium amidosulfate at a concentration of 319 ppm by mass in terms of amidosulfuric acid.

As a result of the analysis by ion chromatography, the solvent composition was found to be a solvent composition (having EC/EMC (volume ratio) of 3/7) including LiFSI at a concentration of 0.6 M (9.3% by mass), LiPF$_6$ at a concentration of 0.6 M (7.5% by mass), and amidosulfuric acid (ion) at a concentration of 319 ppm by mass (1900 ppm by mass relative to the total amount of the electrolyte salt and the amidosulfuric acid component).

Then, using the obtained solvent composition, a laminate battery was produced in the same manner as in Example 1-1. Table 1 shows the results of measuring and evaluating the characteristics of the battery.

Example 1-4

A solvent composition was obtained in the same manner as in Example 1-1 except that taurine (2-aminoethanesulfonic acid (aminoethylsulfonic acid), $H_2N$—$CH_2$—$CH_2$—$SO_3H$) was used in place of amidosulfuric acid and the amount thereof added was changed. The electrolyte was dissolved in the solvent composition, and an undissolved residue was not observed by visual inspection.

The obtained solvent composition was analyzed by ion chromatography and found to include taurine at a concentration of 522 ppm by mass.

As a result of the analysis by ion chromatography, the solvent composition was found to be a solvent composition (having EC/EMC (volume ratio) of 3/7) including LiFSI at a concentration of 0.6 M (9.3% by mass), LiPF$_6$ at a concentration of 0.6 M (7.5% by mass), and taurine at a concentration of 522 ppm by mass (3138 ppm by mass relative to the total amount of the electrolyte salt and the amidosulfuric acid component).

Then, using the obtained solvent composition, a laminate battery was produced in the same manner as in Example 1-1. Table 1 shows the results of measuring and evaluating the characteristics of the battery.

Example 1-5

A solvent composition was obtained in the same manner as in Example 1-1 except that sodium amidosulfate was used in place of amidosulfuric acid and the amount thereof added was changed. The electrolyte was dissolved in the solvent composition, and an undissolved residue was not observed by visual inspection.

The obtained solvent composition was analyzed by ion chromatography and found to include sodium amidosulfate at a concentration of 138 ppm by mass in terms of amidosulfuric acid.

As a result of the analysis by ion chromatography, the solvent composition was found to be a solvent composition (having EC/EMC (volume ratio) of 3/7) including LiFSI at a concentration of 0.6 M (9.3% by mass), $LiPF_6$ at a concentration of 0.6 M (7.5% by mass), and amidosulfuric acid (ion) at a concentration of 138 ppm by mass (834 ppm by mass relative to the total amount of the electrolyte salt and the amidosulfuric acid component).

Then, using the obtained solvent composition, a laminate battery was produced in the same manner as in Example 1-1. Table 1 shows the results of measuring and evaluating the characteristics of the battery.

Reference Example 1-1

A solvent composition [a solvent composition (having EC/EMC (volume ratio) of 3/7), including LiFSI at a concentration of 0.6 M (9.3% by mass) and $LiPF_6$ at a concentration of 0.6 M (7.5% by mass), and including no amidosulfuric acid] was obtained in the same manner as in Example 1-1 except that no amidosulfuric acid was used.

Then, using the obtained solvent composition, a laminate battery was produced in the same manner as in Example 1-1. Table 1 shows the results of measuring and evaluating the characteristics of the battery.

amidosulfuric acid component was found to effectively function regardless of the form (a salt or ions (free form)) thereof.

Reference Example 1-2

A solvent composition was obtained in the same manner as in Example 1-1 except that only $LiPF_6$ was used as the electrolyte salt and the amount of amidosulfuric acid added was changed. The electrolyte was dissolved in the solvent composition, and an undissolved residue was not observed by visual inspection.

The obtained solvent composition was analyzed by ion chromatography and found to include amidosulfuric acid at a concentration of 270 ppm by mass.

As a result of the analysis by ion chromatography, the solvent composition was found to be a solvent composition (having EC/EMC (volume ratio) of 3/7) including $LiPF_6$ at a concentration of 1.2 M and amidosulfuric acid (ion) at a concentration of 270 ppm by mass (1789 ppm by mass relative to the total amount of the electrolyte salt and the amidosulfuric acid component).

TABLE 1

| | Solvent Composition (Non-aqueous Electrolyte Solution) | | | Low-temperature Charge and Discharge | | | | High-temperature Storage Characteristic (Storage at 60° C. for 2 weeks) | | | |
|---|---|---|---|---|---|---|---|---|---|---|---|
| | | | Amidosulfuric Acid Component | | | Discharge Capacity | Discharge Capacity | | | | |
| | | | Proportion | Resistance | | | | | | | |
| | Electrolyte Salt Kind | Concentration | (ppm by mass) relative to Total Amount of Electrolyte Salt and Amidosulfuric Acid | 25° C. Decrease Rate (%) relative to Reference Example | −30° C. Decrease Rate (%) relative to Reference Example | (−20° C.) Increase Rate (%) relative to Reference Example | (−20° C.) Increase Rate (%) relative to Reference Example | Retention Rate relative to Initial Capacity at 0.2 C | | Decrease ΔV in Voltage (V) | Cycle at 45° C. 300-Cycle Capacity Retention Rate (%) |
| | (Concentration) | (ppm by mass) | Amidosulfuric Acid | | | | | 0.2 C (%) | 2 C (%) | | |
| Reference Example 1-1 | LiFSI (0.6M) + $LiPF_6$ (0.6M) | None | None | — | — | — | — | 87.6 | 84.3 | 0.1538 | 85.5 |
| Example 1-1 | | 6 | 36 | 5.6 | 17.1 | 1.1 | 7.1 | 88.6 | 84.7 | 0.1409 | 87.6 |
| Example 1-2 | | 282 | 1680 | 13.9 | 34.9 | 4.5 | 19.1 | 90.1 | 86.4 | 0.1170 | 89.1 |
| Example 1-3 | | 319 | 1900 | 16.7 | 21.1 | 7.9 | 19.8 | 89.9 | 86.4 | 0.1134 | 88.8 |
| Example 1-4 | | 522 | 3138 | 0.5 | 8.5 | 3.9 | 7.4 | 88.0 | 85.2 | 0.1195 | — |
| Example 1-5 | | 138 | 834 | 0.3 | 1.2 | 0.7 | 1.6 | 88.9 | 85.4 | 0.1151 | — |

As is clear from the results in Table 1, the solvent composition including the amidosulfuric acid component reduced the resistance and improved the charge and discharge characteristic, compared with the solvent composition including no amidosulfuric acid component. The solvent composition including the amidosulfuric acid component also improved the high-temperature storage characteristic and the cycle characteristic. This tendency was more prominent along with the increase in the amount (concentration) of the amidosulfuric acid component when the same kind of amidosulfuric acid component was used (Comparison between Examples 1-1 and 1-2).

Meanwhile, as is clear from the results in Examples 1-3 to 1-5 in which lithium amidosulfate, taurine, or sodium amidosulfate was used in place of amidosulfuric acid, the Then, using the obtained solvent composition, a laminate battery was produced in the same manner as in Example 1-1. Table 2 shows the results of measuring and evaluating the characteristics of the battery.

Reference Example 1-3

A solvent composition [a solvent composition (having an EC/EMC (volume ratio) of 3/7), including $LiPF_6$ at a concentration of 1.2 M, and including no amidosulfuric acid] was obtained in the same manner as in Reference Example 1-2 except that no amidosulfuric acid was used.

Then, using the obtained solvent composition, a laminate battery was produced in the same manner as in Example 1-1. Table 2 shows the results of measuring and evaluating the characteristics of the battery.

TABLE 2

| | Solvent Composition (Non-aqueous Electrolyte Solution) | | | | Low-temperature Charge and Discharge | | High-temperature Storage Characteristic | | | |
|---|---|---|---|---|---|---|---|---|---|---|
| | | | Amidosulfuric Acid Component | | | | | | | |
| | | | Proportion relative to | Resistance | | Discharge Capacity | Charge Capacity | (Storage at 60° C. for 2 weeks) | | |
| | Electrolyte Salt Kind | Concentration | Total Amount of Electrolyte Salt and Amidosulfuric Acid | 25° C. Decrease Rate (%) relative to | −30° C. Decrease Rate (%) relative to | (−20° C.) Increase Rate (%) relative to | (−20° C.) Increase Rate (%) relative to | Retention Rate relative to Initial Capacity at 0.2 C | Decrease ΔV | Cycle at 45° C. 300-Cycle Capacity |
| | (Concentration) | (ppm by mass) | (ppm by mass) | Reference Example | Reference Example | Reference Example | Reference Example | 0.2 C (%) | 2 C (%) | in Voltage (V) | Retention Rate (%) |
| Reference Example 1-3 | LiPF$_6$ (1.2M) | None | None | — | — | — | — | 86.0 | 83.6 | 0.1147 | 87.6 |
| Reference Example 1-2 | | 270 | 1789 | 4.2 | 3.6 | 0.9 | 6.5 | 86.4 | 84.2 | 0.1108 | 88.0 |

As is clear from the results in Table 2, the solvent composition including LiPF$_6$ allowed the battery to show the same tendency because it included the amidosulfuric acid component, but this tendency was, from the comparison to Table 1, found to be prominent when LiFSI was used as the electrolyte salt.

Example 2 Series

Subsequently, the storage stability of the solvent composition was evaluated. The analysis and evaluation methods performed in Example 2 series are as follows.
[$^{19}$F-NMR Measurement]
The $^{19}$F-NMR measurement was performed in the same manner as described above.
[pH Measurement]
The solvent composition was diluted with ultrapure water (more than 18.2 Ω·cm) 91 folds to prepare a measurement solution, and the pH of the composition was measured using automatic titrator COM-1700A (manufactured by HIRANUMA SANGYO Co., Ltd.).
[Measurement of Water Content]
The water content of the solvent composition was measured using Karl Fischer Titrator AQ-2000 (manufactured by HIRANUMA SANGYO Co., Ltd.) with Aqualyte RS-A (manufactured by HIRANUMA SANGYO Co., Ltd.) used as a generator solution and Aqualyte CN (manufactured by HIRANUMA SANGYO Co., Ltd.) as a counter solution.
[Measurement by Ion Chromatography]
The composition was diluted with ultrapure water (more than 18.2 Ω·cm) 100 folds to prepare a measurement solution, and amidosulfuric acid, a fluorine ion, and a sulfate ion included in the composition were measured using ion chromatography system ICS-3000 (manufactured by Nippon Dionex K.K.).
  Separation mode: Ion exchange
  Eluent: 7 mM to 18 mM aqueous KOH solution
  Detector: Conductivity detector
  Column: Anion analysis column Ion PAC AS-17C (manufactured by Nippon Dionex K.K.)
[ICP Measurement]
The composition was diluted with ultrapure water (more than 18.2 Ω·cm) 100 folds to prepare a measurement solution, and iron included in the composition was measured using multi-type ICP emission spectrometer ICPE-9000 (manufactured by SHIMADZU CORPORATION).
[Resistance Value]
The resistance decrease rate with respect to the reference example (the solvent composition including no amidosulfuric acid component) was obtained in the same manner as described above.
[Charge and Discharge Capacity]
The capacity increase rate with respect to the reference example (the solvent composition including no amidosulfuric acid component) was obtained in the same manner as described above.
[High-Temperature Storage Characteristic]
The capacity retention rate and the decrease in voltage were obtained in the same manner as described above.
[Cycle at 45° C.]
The capacity retention rate after the 300-cycle charge and discharge was obtained in the same manner as described above.

Example 2-1

Amidosulfuric acid was added to LiFSI obtained in Example 1-1, and the mixture was dissolved in ethyl methyl carbonate (EMC) as the solvent having a relative permittivity of 10 or less to produce a solution having a concentration of LiFSI of 49.9% by mass. The concentration of LiFSI was measured by $^{19}$F-NMR.

By water content analysis according to the Karl Fischer method, this solution was found to have a water content of 44 ppm by mass. Further, by ion chromatography, the solution was found to include the fluoride ion at 31 ppm by mass, the sulfate ion at 8 ppm by mass, and the amidosulfate ion at 23 ppm by mass. The pH of the solution checked by the automatic potentiometric titrator was 7.

This solution was stored in a hermetically sealed propylene container at 25° C. for 1 month, then analyzed in the same manner, and as a result found to include LiFSI at 49.9% by mass, the fluoride ion at 32 ppm by mass, and the sulfate ion at 9 ppm by mass.

Examples 2-2 to 2-17 and Reference Examples 2-1 to 2-7

The concentration of the components in the solution during production and after storage of the solution was measured in the same manner as in Example 2-1 except that the conditions (the kind of the solvent, the concentration of LiFSI, the concentration of amidosulfuric acid, the pH, the storage conditions, and the like) were changed to the conditions shown in Table 3. In Examples 2-10, 2-12, and 2-13, the pH was adjusted by adding a pH adjuster.

Table 3 shows all these results. In Table 3, "EMC" represents ethyl methyl carbonate, "EC" represents ethylene carbonate, and "PC" represents propylene carbonate.

Example 2-13

Amidosulfuric acid was added to LiFSI obtained in Example 1-1, and the mixture was dissolved in ethyl methyl carbonate (EMC) as the solvent having a relative permittivity of 10 or less to produce a solution having a concentration of LiFSI of 49.9% by mass. The concentration of LiFSI was measured by $^{19}$F-NMR.

TABLE 3

| | | | | In Production | | | | | After Storage | | |
|---|---|---|---|---|---|---|---|---|---|---|---|
| | | Solvent | pH | Water Content (ppm by mass) | Concentration of LiFSI (% by mass) | Amidosulfate Ion (ppm by mass) | Fluoride Ion (ppm by mass) | Sulfate Ion (ppm by mass) | Storage Condition | Concentration of LiFSI (% by mass) | Fluoride Ion (ppm by mass) | Sulfate Ion (ppm by mass) |
| Examples | 2-1 | EMC | 7 | 44 | 49.9 | 23 | 31 | 8 | 25° C. for 1 month | 49.9 | 32 | 9 |
| | 2-2 | EMC | 7 | 44 | 49.9 | 23 | 31 | 8 | 25° C. for 3 months | 49.9 | 32 | 9 |
| | 2-3 | EMC | 7 | 44 | 49.9 | 23 | 31 | 8 | 40° C. for 1 month | 49.9 | 33 | 10 |
| | 2-4 | EMC | 7 | 235 | 49.9 | 23 | 31 | 8 | 40° C. for 1 month | 49.9 | 35 | 11 |
| | 2-5 | EMC | 7 | 57 | 49.9 | 24 | 19 | 37 | 25° C. for 1 month | 49.9 | 20 | 37 |
| | 2-6 | EMC | 7 | 21 | 41.0 | 1.7 | 26 | 5 | 25° C. for 1 month | 41.0 | 26 | 6 |
| | 2-7 | EMC | 7 | 60 | 31.1 | 34 | 29 | 39 | 25° C. for 1 month | 31.1 | 30 | 39 |
| | 2-8 | EMC | 7 | 23 | 10.1 | 0.1 | 8 | 3 | 25° C. for 1 month | 10.1 | 8 | 3 |
| | 2-9 | EMC | 4 | 57 | 50.0 | 0.1 | 30 | 8 | 25° C. for 1 month | 50.0 | 31 | 9 |
| | 2-10 | EMC | 7 | 46 | 50.0 | 0.1 | 32 | 6 | 25° C. for 1 month | 50.0 | 33 | 7 |
| | 2-11 | EMC | 9 | 33 | 48.9 | 5.5 | 36 | 8 | 25° C. for 1 month | 48.9 | 36 | 8 |
| | 2-12 | EMC | 11 | 2640 | 50.0 | 5.5 | 40 | 6 | 25° C. for 1 month | 50.0 | 40 | 8 |
| Comparative Examples | 2-1 | EC | 7 | 34 | 49.1 | 23 | 31 | 8 | 25° C. for 1 month | 49.0 | 51 | 28 |
| | 2-2 | EC | 7 | 34 | 49.1 | 23 | 31 | 8 | 25° C. for 3 months | 49.0 | 66 | 129 |
| | 2-3 | EC | 7 | 34 | 49.1 | 23 | 31 | 8 | 40° C. for 1 month | 49.0 | 56 | 105 |
| | 2-4 | EC | 7 | 309 | 49.1 | 23 | 31 | 8 | 40° C. for 1 month | 48.8 | 626 | 615 |
| | 2-5 | EC | 7 | 10 | 40.5 | 0 | 26 | 4 | 40° C. for 1 month | 40.2 | 52 | 37 |
| | 2-6 | PC | 7 | 286 | 49.4 | 23 | 31 | 8 | 40° C. for 1 month | 49.1 | 193 | 393 |
| | 2-7 | EMC | 7 | 21 | 40.1 | 0 | 26 | 5 | 40° C. for 1 month | 40.1 | 26 | 5 |

As shown in Table 3, the examples (compared with the reference examples) showed no difference in the concentration of LiFSI between before and after the storage and allowed the solution after the storage to maintain the concentration of the fluoride ion component and the sulfate ion component, and it was thus clearly found that the decomposition of LiFSI was reduced and the solution had good storage stability.

On the other hand, the reference examples showed that the concentration of LiFSI was reduced after the storage (further, the concentration of the fluoride ion component and the sulfate ion component was increased), and it was thus found that the decomposition reaction of LiFSI and the like was progressed during the storage, and the solution had inferior storage stability.

In addition, the reference examples showed that the concentration of the ion components after the storage increases, and the decomposition of LiFSI was accelerated, along with the increase in the water content in the solution. On the other hand, the examples showed no large change in the concentration of the fluoride ion and the sulfate ion even when the water content in the solution was increased, and the solution was found to have good storage stability.

By ion chromatography, this solution was found to include the amidosulfate ion at 23 ppm by mass. By water content analysis according to the Karl Fischer method, this solution was found to have a water content of 44 ppm by mass. By ICP analysis, the solution was analyzed for an iron component, but no iron component was detected (0 ppm by mass). A test piece of SUS 304 used as a material of a commonly-used metal container was immersed in this solution and stored in a hermetically sealed polypropylene container at 25° C. for 3 months. Then, the solution was analyzed in the same manner, and as a result, no iron component was detected (0 ppm by mass) in the solution.

Examples 2-14 and Reference Examples 2-8 to 2-9

The concentration of the components in the solution during production and after storage of the solution was measured in the same manner as in Example 2-13 except that the conditions (the kind of the solvent, the concentration of LiFSI, the storage conditions, and the like) were changed to the conditions shown in Table 4.

Table 4 shows all these results. In Table 4, "EMC" represents ethyl methyl carbonate, and "EC" represents ethylene carbonate.

TABLE 4

| | In Production | | | | After Storage | |
|---|---|---|---|---|---|---|
| | Solvent | Concentration of LiFSI (% by mass) | Water Content (ppm by mass) | Amidosulfate Ion (ppm by mass) | Iron Component (ppm by mass) | Storage Condition | Iron Component (ppm by mass) |
| Example 2-13 | EMC | 49.9 | 44 | 23 | 0 | 25° C. for 3 months | 0 |
| Example 2-14 | EMC | 49.9 | 44 | 23 | 0 | 40° C. for 1 month | 0 |
| Reference Example 2-8 | EC | 49.1 | 34 | 23 | 0 | 25° C. for 3 months | 1 |
| Reference Example 2-9 | EC | 49.1 | 34 | 23 | 0 | 40° C. for 1 month | 1 |

The fluorine-containing sulfonylimide salt such as the sulfonylimide compound (1) can be synthesized, for example, by the following method.

Synthesis Example 1

Step of Synthesizing Lithium Bis(fluorosulfonyl)imide (Lithiation Step)

Lithium carbonate in an amount of 214 g was mixed with 966 g of water to prepare a slurry, which was cooled in an ice bath, and 1000 g of bis(fluorosulfonyl)imide was added dropwise to the slurry over 45 minutes. From the cloudy liquid obtained, an insoluble matter was removed with Kiriyama filter paper No. 5C to give a solution (having a total amount of water and lithium bis(fluorosulfonyl)imide of 99.8% by mass) including lithium bis(fluorosulfonyl) imide at 50.1% by mass in water. The concentration of lithium bis(fluorosulfonyl)imide was measured by $^{19}$F-NMR.

[Extraction Step]

To 200 g of the reaction solution obtained in the lithiation step, 60 g of water and 600 g of butyl acetate were added and stirred at a room temperature for 10 minutes. Then, the stirring was stopped, an aqueous phase separated from a butyl acetate phase was removed, and thus an organic layer was obtained. To this organic layer, 100 g of a 15% by mass solution of lithium hydroxide in water was added and stirred at a room temperature for 10 minutes. Thereafter, an aqueous phase was removed from the reaction solution to give a solution of lithium bis(fluorosulfonyl)imide in butyl acetate.

[Condensing Step]

From the solution of lithium bis(fluorosulfonyl)imide in butyl acetate obtained in the lithiation step, the reaction solvent was partially distilled away under reduced pressure, using a rotary evaporator ("REN-1000" manufactured by IWAKI), and a generated insoluble matter was filtered out to give 228 g of a lithium bis(fluorosulfonyl)imide solution (concentration: 43% by mass).

Into a 500-mL separable flask equipped with a dropping funnel, a cooling tube, and a distillation receiver, 228 g of the solution including 98.2 g of lithium bis(fluorosulfonyl) imide in butyl acetate was added. The pressure in the separable flask was reduced to 667 Pa using a vacuum pump, the separable flask was immersed in an oil bath heated at 55° C., and the solution in butyl acetate in the separable flask was slowly heated under stirring, to distil the solvent, or butyl acetate away. Into the separable flask, 1,2,4-trimethylbenzene was added as a poor solvent, in the same volume amount as the total amount of the liquid collected in the distillation receiver for 10 minutes after the start of the distillation. Thereafter, 1,2,4-trimethylbenzene was continuously added into the separable flask in the same volume as the distillate liquid every 10 minutes to condense the reaction solution while changing the blending ratio between butyl acetate (reaction solvent) and 1,2,4-trimethylbenzene in the system, and a white crystal of lithium bis(fluorosulfonyl)imide was thus precipitated. The procedure was repeated until the supernatant liquid in the separable flask became transparent, and then the flask was cooled to a room temperature. The obtained suspension of a lithium bis(fluorosulfonyl)imide crystal was filtered to obtain the lithium bis(fluorosulfonyl)imide crystal. The time from the start of heating the solution in butyl acetate to the end of the condensing step was 6 hours, and the time required until the start of precipitating the white crystal was 2 hours. Next, the obtained crystal was washed with a small amount of hexane, then moved into a flat-bottom tray, and dried under reduced pressure at 55° C. and 667 Pa for 12 hours, to give a white crystal of lithium bis(fluorosulfonyl)imide (yield: 92.3 g).

Synthesis Example 2

A solution of lithium bis(fluorosulfonyl)imide in water was obtained in the same manner as in Synthesis Example 1.

[Condensing Step]

To 200 g of the reaction solution obtained in the lithiation step, 60 g of water and 600 g of EMC were added and stirred at a room temperature for 10 minutes. Then, the stirring was stopped, an aqueous phase separated from an EMC phase was removed, and thus a solution of lithium bis(fluorosulfonyl)imide in EMC was obtained as an organic phase. The obtained solution was subjected to distillation under reduced pressure at 55° C. and 2000 Pa, using a rotary evaporator ("REN-1000" manufactured by IWAKI). Subsequently, 600 g of EMC was added to the solution, which was subjected to the same distillation under reduced pressure. The same procedure was further repeated 6 times. A generated insoluble matter was filtered out to give 240 g of a solution of lithium bis(fluorosulfonyl)imide in EMC.

Synthesis Example 3

By the same method as in Synthesis Example 1, 223 g of a solution of lithium bis(fluorosulfonyl)imide (concentration: 44% by mass) in butyl acetate was obtained.

[Condensing Step]

To the obtained butyl acetate solution, 100 g of ethylene carbonate (EC) and 220 g of ethyl methyl carbonate (EMC) were added. The obtained solution was subjected to distillation under reduced pressure at 55° C. and 2000 Pa, using a rotary evaporator ("REN-1000" manufactured by IWAKI). Subsequently, 220 g of ethyl methyl carbonate was added to the solution, which was subjected to the same distillation under reduced pressure. The same procedure was further repeated 3 times. A generated insoluble matter was filtered out to give 390.3 g of a solution of lithium bis(fluorosulfonyl)imide in EC and EMC. The amount of lithium bis(fluorosulfonyl)imide was 98.2 g, the amount of EC was 100.0 g, and the amount of EMC was 192.1 g.

INDUSTRIAL APPLICABILITY

The present invention can provide a novel electrolyte composition, solvent composition, and the like that are usable as an electrolyte solution and the like.

The invention claimed is:

1. An electrolyte composition comprising:
a sulfonylimide compound represented by general formula (1) as an electrolyte salt,
wherein the general formula (1) is $LiN(X^1SO_2)(X^2SO_2)$, where $X^1$ and $X^2$ are identical to or different from each other, and each represent a fluorine atom, an alkyl group with a carbon number of 1 to 6, or a fluoroalkyl group with a carbon number of 1 to 6; and
an amidosulfuric acid component comprising at least one or more of amidosulfuric acid and a salt thereof, an amidosulfuric acid derivative and a salt thereof represented by general formula (4),
wherein the general formula (4) is $R^1R^2NSO_2(OM)$, where $R^1$ and $R^2$ each represent a hydrogen atom, an alkyl group with a carbon number of 1 to 10, a cycloalkyl group with a carbon number of 3 to 10, an aryl group with a carbon number of 6 to 16, an aralkyl group with a carbon number of 7 to 16, or an alkanoyl group with a carbon number of 2 to 16,
and where M represents a hydrogen atom or a metal atom,
wherein a proportion of the amidosulfuric acid component relative to a total amount of the electrolyte salt and the amidosulfuric acid component is 0.1 ppm by mass or more to 10,000 ppm by mass or less.

2. The electrolyte composition of claim 1, wherein
the electrolyte salt further includes at least one compound selected from the group consisting of a compound represented by the following general formula (2), a compound represented by the following general formula (3), and lithium hexafluoroarsenate, $$LiPF_a(C_mF_{2m+1})_{6-a} (0 \leq a \leq 6, 1 \leq m \leq 4) \quad (2)$$

$$LiBF_b(C_nF_{2n+1})_{4-b} (0 \leq b \leq 4, 1 \leq n \leq 4) \quad (3).$$

3. The electrolyte composition of claim 1, wherein the amidosulfuric acid component includes at least one selected from amidosulfuric acid or an alkali metal salt of amidosulfuric acid.

4. The electrolyte composition of claim 1, having a fluoride ion at a concentration of 40 ppm by mass or less.

5. The electrolyte composition of claim 1, wherein the electrolyte composition consists of only the electrolyte salt and the amidosulfuric acid component.

6. A battery comprising:
an electrolyte solution including the electrolyte composition of claim 1.

7. A solvent composition comprising:
a sulfonylimide compound represented by the following general formula (1) as an electrolyte salt;
an amidosulfuric acid component; and
a solvent, $$LiN(X^1SO_2)(X^2SO_2) \quad (1),$$

where $X^1$ and $X^2$ are identical to or different from each other, and each represent a fluorine atom, an alkyl group with a carbon number of 1 to 6, or a fluoroalkyl group with a carbon number of 1 to 6; and
the amidosulfuric acid component comprises at least one or more of amidosulfuric acid and a salt thereof, an amidosulfuric acid derivative and a salt thereof represented by general formula (4),
wherein the general formula (4) is $R^1R^2NSO_2(OM)$, where $R^1$ and $R^2$ each represent a hydrogen atom, an alkyl group with a carbon number of 1 to 10, a cycloalkyl group with a carbon number of 3 to 10, an aryl group with a carbon number of 6 to 16, an aralkyl group with a carbon number of 7 to 16, or an alkanoyl group with a carbon number of 2 to 16, and where M represents a hydrogen atom or a metal atom,
wherein a proportion of the amidosulfuric acid component relative to a total amount of the electrolyte salt and the amidosulfuric acid component is 0.1 ppm by mass or more to 10,000 ppm by mass or less.

8. The solvent composition of claim 7, wherein
the electrolyte salt further includes at least one compound selected from the group consisting of a compound represented by the following general formula (2), a compound represented by the following general formula (3), and lithium hexafluoroarsenate, $$LiPF_a(C_mF_{2m+1})_{6-a} (0 \leq a \leq 6, 1 \leq m \leq 4) \quad (2)$$

$$LiBF_b(C_nF_{2n+1})_{4-b} (0 \leq b \leq 4, 1 \leq n \leq 4) \quad (3).$$

9. The solvent composition of claim 7, wherein
the amidosulfuric acid component includes at least one selected from amidosulfuric acid or an alkali metal salt of amidosulfuric acid.

10. The solvent composition of claim 7, wherein
a proportion of the amidosulfuric acid component relative to the whole solvent composition is 0.1 ppm by mass or more.

11. The solvent composition of claim 7, wherein
a proportion of the amidosulfuric acid component relative to the whole solvent composition is 1 ppm by mass or more, and a proportion of the amidosulfuric acid component relative to a total amount of the electrolyte salt and the amidosulfuric acid component is 5 ppm by mass or more.

12. The solvent composition of claim 7, further comprising:
water at a concentration of 0.1 ppm by mass to 3000 ppm by mass.

13. The solvent composition of claim 7, wherein
the solvent includes a solvent having a relative permittivity of 10 or less.

14. The solvent composition of claim 7, wherein
the solvent includes a chain carbonate.

15. The solvent composition of claim 14, wherein
a proportion of the chain carbonate relative to the whole solvent is 40% by volume or more.

16. A battery comprising:
an electrolyte solution including the solvent composition of claim 7.

17. A non-aqueous electrolyte solution comprising:
a sulfonylimide compound represented by the following general formula (1) as an electrolyte salt;
an amidosulfuric acid component; and
a solvent, $$LiN(X^1SO_2)(X^2SO_2) \quad (1),$$

where $X^1$ and $X^2$ are identical to or different from each other, and each represent a fluorine atom, an alkyl group with a carbon number of 1 to 6, or a fluoroalkyl group with a carbon number of 1 to 6; and the amidosulfuric acid component comprises at least one or more of amidosulfuric acid and a salt thereof, an amidosulfuric acid derivative and a salt thereof represented by general formula (4), wherein the general formula (4) is $R^1R^2NSO_2(OM)$, where $R^1$ and $R^2$ each represent a hydrogen atom, an alkyl group with a carbon number of 1 to 10, a cycloalkyl group with a carbon number of 3 to 10, an aryl group with a carbon number of 6 to 16, an aralkyl group with a carbon number of 7 to 16, or an alkanoyl group with a carbon number of 2 to 16, and where M represents a hydrogen atom or a metal atom, wherein a proportion of the amidosulfuric acid component relative to a total amount of the electrolyte salt and the amidosulfuric acid component is 0.1 ppm by mass or more to 10,000 ppm by mass or less.

18. The non-aqueous electrolyte solution of claim 17, wherein the electrolyte salt further includes at least one compound selected from the group consisting of a compound represented by the following general formula (2), a compound represented by the following general formula (3), and lithium hexafluoroarsenate, $$LiPF_a(C_mF_{2m+1})_{6-a} (0 \leq a \leq 6, 1 \leq m \leq 4) \qquad (2)$$

$$LiBF_b(C_nF_{2n+1})_{4-b} (0 \leq b \leq 4, 1 \leq n \leq 4) \qquad (3).$$

19. The non-aqueous electrolyte solution of claim 17, wherein the amidosulfuric acid component includes at least one selected from amidosulfuric acid or an alkali metal salt of amidosulfuric acid.

20. The non-aqueous electrolyte solution of claim 17, wherein the solvent includes a solvent having a relative permittivity of 10 or less.

21. The non-aqueous electrolyte solution of claim 17, wherein the solvent includes a chain carbonate.

22. A battery comprising:

the non-aqueous electrolyte solution of claim 17.

* * * * *